US012620670B2

(12) United States Patent
Sun et al.

(10) Patent No.: US 12,620,670 B2
(45) Date of Patent: May 5, 2026

(54) BATTERY PACK AND ELECTRIC VEHICLE

(71) Applicant: BYD COMPANY LIMITED,
Shenzhen (CN)

(72) Inventors: Huajun Sun, Shenzhen (CN); Zhipei Lu, Shenzhen (CN); Qingbo Peng, Shenzhen (CN); Long Wan, Shenzhen (CN); Yan Zhu, Shenzhen (CN)

(73) Assignee: BYD COMPANY LIMITED,
Shenzhen (CN)

( * ) Notice: Subject to any disclaimer, the term of this patent is extended or adjusted under 35 U.S.C. 154(b) by 864 days.

(21) Appl. No.: 17/971,901

(22) Filed: Oct. 24, 2022

(65) Prior Publication Data

US 2023/0041540 A1      Feb. 9, 2023

Related U.S. Application Data

(63) Continuation of application No. PCT/CN2020/124749, filed on Oct. 29, 2020.

(30) Foreign Application Priority Data

Apr. 24, 2020      (CN) .......................... 202010334642.0

(51) Int. Cl.
*H01M 50/291*           (2021.01)
*B60L 50/64*            (2019.01)
(Continued)

(52) U.S. Cl.
CPC .......... *H01M 50/291* (2021.01); *B60L 50/64* (2019.02); *H01M 50/178* (2021.01);
(Continued)

(58) Field of Classification Search
CPC .......... H01M 2220/20; H01M 50/291; H01M 50/211; H01M 50/224; H01M 50/242;
(Continued)

(56) References Cited

U.S. PATENT DOCUMENTS

| 8,268,469 B2 | 9/2012 | Hermann et al. |
| 9,065,103 B2 | 6/2015 | Straubel et al. |
(Continued)

FOREIGN PATENT DOCUMENTS

| CN | 105576171 | * | 5/2016 | .............. H01M 2/10 |
| CN | 105576171 A | | 5/2016 | |
(Continued)

OTHER PUBLICATIONS

English translation of CN205609585.*

(Continued)

*Primary Examiner* — Kiran Quraishi Akhtar
(74) *Attorney, Agent, or Firm* — Wenye Tan

(57)      ABSTRACT

A battery pack includes a housing, and at least one housing structural beam and multiple electrode core strings electrically connected to one another located in the housing. The housing includes a housing body, including a top plate and a bottom plate arranged opposite to each other in a first direction. The structural beam is located between the top plate and the bottom plate, the at least one structural beam is connected to the top plate and the bottom plate, and divides the interior of the housing into multiple accommodating cavities, and at least one electrode core string is provided in at least one accommodating cavity. A mounting portion is provided on the housing, and the mounting portion is configured to be connected and fixed to an external load. The electrode core string includes multiple electrode core assemblies sequentially disposed in a second direction and connected in series.

23 Claims, 10 Drawing Sheets

(51) Int. Cl.

| | |
|---|---|
| *H01M 50/178* | (2021.01) |
| *H01M 50/211* | (2021.01) |
| *H01M 50/224* | (2021.01) |
| *H01M 50/242* | (2021.01) |
| *H01M 50/271* | (2021.01) |
| *H01M 50/503* | (2021.01) |
| *H01M 50/509* | (2021.01) |
| *H01M 50/548* | (2021.01) |

(52) U.S. Cl.
CPC ....... *H01M 50/211* (2021.01); *H01M 50/224* (2021.01); *H01M 50/242* (2021.01); *H01M 50/271* (2021.01); *H01M 50/503* (2021.01); *H01M 50/509* (2021.01); *H01M 50/548* (2021.01); *H01M 2220/20* (2013.01)

(58) Field of Classification Search
CPC ............. H01M 50/271; H01M 50/503; H01M 50/509; H01M 50/548; H01M 50/204; H01M 50/207; H01M 50/209; H01M 50/249; H01M 50/358; H01M 50/367; H01M 50/289; H01M 50/517; H01M 50/531; H01M 50/586; H01M 50/591; H01M 10/613; H01M 10/625; H01M 10/647; H01M 10/6557; H01M 10/6556; H01M 50/178; H01M 50/10; H01M 50/116; H01M 50/183; H01M 50/20; H01M 50/172; Y02E 60/10; Y02T 10/70; B60L 50/64

See application file for complete search history.

(56) References Cited

U.S. PATENT DOCUMENTS

| | | | |
|---|---|---|---|
| 2011/0174556 A1 | 7/2011 | Hermann et al. | |
| 2012/0129022 A1 | 5/2012 | Kalish et al. | |
| 2014/0178722 A1 | 6/2014 | Straubel et al. | |
| 2019/0067656 A1* | 2/2019 | Zhang ................. | H01M 50/289 |
| 2019/0273232 A1* | 9/2019 | Fu ....................... | H01M 50/284 |
| 2022/0247004 A1* | 8/2022 | Yun ..................... | H01M 10/625 |

FOREIGN PATENT DOCUMENTS

| | | | | | |
|---|---|---|---|---|---|
| CN | 205609585 | * | 9/2016 | .......... | H01M 10/655 |
| CN | 205609585 U | | 9/2016 | | |
| CN | 106132745 A | | 11/2016 | | |
| CN | 106374063 A | | 2/2017 | | |
| CN | 206022451 U | | 3/2017 | | |
| CN | 206225434 U | | 6/2017 | | |
| CN | 107204455 A | | 9/2017 | | |
| CN | 208298914 U | | 12/2018 | | |
| CN | 209544439 | * | 2/2019 | .......... | H01M 10/613 |
| CN | 109742285 A | | 5/2019 | | |
| CN | 209249603 U | | 8/2019 | | |
| CN | 209434264 U | | 9/2019 | | |
| CN | 110323462 A | | 10/2019 | | |
| CN | 209544439 U | | 10/2019 | | |
| CN | 110504395 A | | 11/2019 | | |
| CN | 110518174 A | | 11/2019 | | |
| CN | 110828744 | * | 2/2020 | ........... | H01M 10/42 |
| CN | 110828744 A | | 2/2020 | | |
| CN | 110828745 A | | 2/2020 | | |
| CN | 111293253 A | | 6/2020 | | |
| CN | 111312964 A | | 6/2020 | | |
| EP | 3528312 A1 | | 8/2019 | | |
| JP | 2000306562 A | | 11/2000 | | |
| JP | 2013206666 A | | 10/2013 | | |
| JP | 2017193287 A | | 10/2017 | | |
| JP | 2019169337 A | | 10/2019 | | |
| JP | 2020006811 A | | 1/2020 | | |
| JP | 2020038762 A | | 3/2020 | | |
| JP | 2020064795 A | | 4/2020 | | |
| WO | 2019177275 A1 | | 9/2019 | | |
| WO | WO2019177275 | * | 9/2019 | .......... | H01M 10/653 |

OTHER PUBLICATIONS

English translation of CN110828744.*
English translation of CN105576171.*
English translation of CN209544439.*
The World Intellectual Property Organization (WIPO) International Search Report for PCT/CN2020/124749 Jan. 29, 2021 6 pages (with translation).

\* cited by examiner 410a    300    420a

BATTERY PACK AND ELECTRIC VEHICLE

CROSS-REFERENCE TO RELATED APPLICATIONS

The present application is a continuation application of PCT Application No. PCT/CN2020/124749 filed on Oct. 29, 2020, which claims priority to Chinese Patent Application No. "202010334642.0" filed by BYD Company Limited on Apr. 24, 2020, and entitled "Battery pack and electric vehicle", which is incorporated herein by reference in its entirety.

FIELD

The present disclosure relates to the field of batteries, and specifically to a battery pack and an electric vehicle.

BACKGROUND

With the continuous popularization of new energy vehicles, the requirements raised for use of power batteries in new energy vehicles are becoming increasingly higher. The traditional battery pack is a battery pack structure formed by mounting a battery module into a battery pack housing. The battery module includes a battery set composed of multiple cells arranged in sequence, side plates arranged at two sides of the battery set and end plates arranged at two ends of the battery set. The side plate and the end plate are connected by a bolt, a tie rod or by welding, to fix the battery set. After the battery module is assembled, it is mounted in the battery pack housing by a fastener such as a bolt. The assembly method where the batteries are assembled into a battery module and then the battery module is mounted in the battery pack housing has the problems of troublesome assembly process, and complex assembly procedure, causing increased manpower and other costs. The structural components of the battery module itself will also cause a heavy weight of the battery pack, thus reducing the utilization of the internal space of the battery pack.

SUMMARY

The present disclosure proposes a battery pack and an electric vehicle. The battery pack has increased space utilization, reduced weight, and improved energy density.

In a first aspect, an embodiment of the present disclosure provides a battery pack, which includes a housing and at least one structural beam, and multiple electrode core strings electrically connected to one another located in the housing.

The housing includes a housing body, including a top plate and a bottom plate arranged opposite to each other in a first direction, where the first direction is a height direction of the housing. The structural beam is located between the top plate and the bottom plate. The at least one structural beam is connected to the top plate and the bottom plate, and divides the interior of the housing into multiple accommodating cavities, and at least one electrode core string is provided in at least one accommodating cavity.

A mounting portion is provided on the housing, and the mounting portion is configured to be connected and fixed to an external load.

The electrode core string includes multiple electrode core assemblies sequentially disposed in a second direction and connected in series. The electrode core assembly is encapsulated in an encapsulation film; and a length direction of the electrode core string extends in the second direction, where the second direction is a width direction of the housing or the second direction is a length direction of the housing.

The present disclosure has the following beneficial effects. In the present disclosure, electrode core strings are used, so as to omit the structures fixing the battery casing and the battery module in the related art. This improves the space utilization of the battery pack, reduces the weight of the battery pack, and increases the energy density of the battery pack. Moreover, the structure of the battery pack of the present disclosure is simple, and the assembly efficiency is high, thus reducing the production cost. Furthermore, in the housing of the battery pack according to the present disclosure, the structural beam is located between the top plate and the bottom plate, and the structural beam is connected to the top plate and the bottom plate. Using such a design, the structural beam, the top plate and the bottom plate form an "L"-shaped structure. This structure has high strength and rigidity, to meet the requirements of the housing of the battery pack for load-bearing capacity, impact resistance and extrusion resistance. Moreover, the structure of the housing of the battery pack according to the present disclosure is simple, the production cost is low, and the space utilization rate is high. In addition, the structural beam divides the housing into multiple accommodating cavities. When thermal runaway occurs to a battery core assembly or cell in one of the accommodating cavities, other accommodating cavities will not be affected, thus improving the safety of the battery pack during operation. Furthermore, when this battery pack is mounted on a vehicle, the structural strength of the battery pack provides part of the structural strength of the vehicle, to improve the structural strength of the vehicle, help to meet the design requirement of lightweight of the electric vehicle, and reduce the design and manufacturing costs of the vehicle. Moreover, in the embodiment of the present disclosure, the electrode core assembly is encapsulated in an encapsulation film and multiple electrode core assemblies are connected in series into an electrode core string. The electrode core string is arranged in the housing of the battery pack, and sealed dually by the encapsulation film and the housing of the battery pack, so the sealing effect is improved.

In a second aspect, an embodiment of the present disclosure provides an electric vehicle, which includes a vehicle body and a battery pack provided in the embodiment according to the first aspect, where the battery pack is fixed to the vehicle body by the mounting portion.

BRIEF DESCRIPTION OF THE DRAWINGS

For clearer description of the technical solutions in the embodiments of the present disclosure, the accompanying drawings are briefly introduced below. Obviously, the accompanying drawings in the following description are only some embodiments of the present disclosure, and a person of ordinary skill in the art may obtain other drawings from these accompanying drawings without creative effort.

DETAILED DESCRIPTION

The following descriptions are exemplary embodiments of the present disclosure. It should be noted that, for a person skilled in the art, several improvements and modifications can be made without departing from the principles of the present disclosure, and these improvements and modifications are also considered to fall within the scope of the present disclosure.

In the description of the present disclosure, it should be understood that the terms "length", "width", "top", "bottom", "front", "back", "left", "right", "vertical", "horizontal", "top", "bottom", "inside", "outside" and other directions or positional relationships indicated are based on the directions or positional relationships shown in the accompanying drawings, which are only for the convenience of describing the present disclosure and simplifying the description rather than indicating or implying that the apparatus or element referred to must have a specific direction, or be constructed and operated in a specific direction. Therefore, this cannot be understood as a limitation on the present disclosure.

In addition, terms "first" and "second" are used only for a purpose of description, and shall not be construed as indicating or implying relative importance or implying a quantity of indicated technical features. Therefore, a feature restricted by "first" or "second" may explicitly indicate or implicitly include one or more such features. In the descriptions of the present disclosure, "multiple" means two or more, unless otherwise definitely and specifically limited.

In the present disclosure, unless otherwise explicitly specified or defined, the terms such as "mount", "install", "connect", "connection", and "fixed" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components or interaction between two components. A person of ordinary skill in the art may understand the specific meanings of the foregoing terms in the present disclosure according to specific situations.

Figure 1:
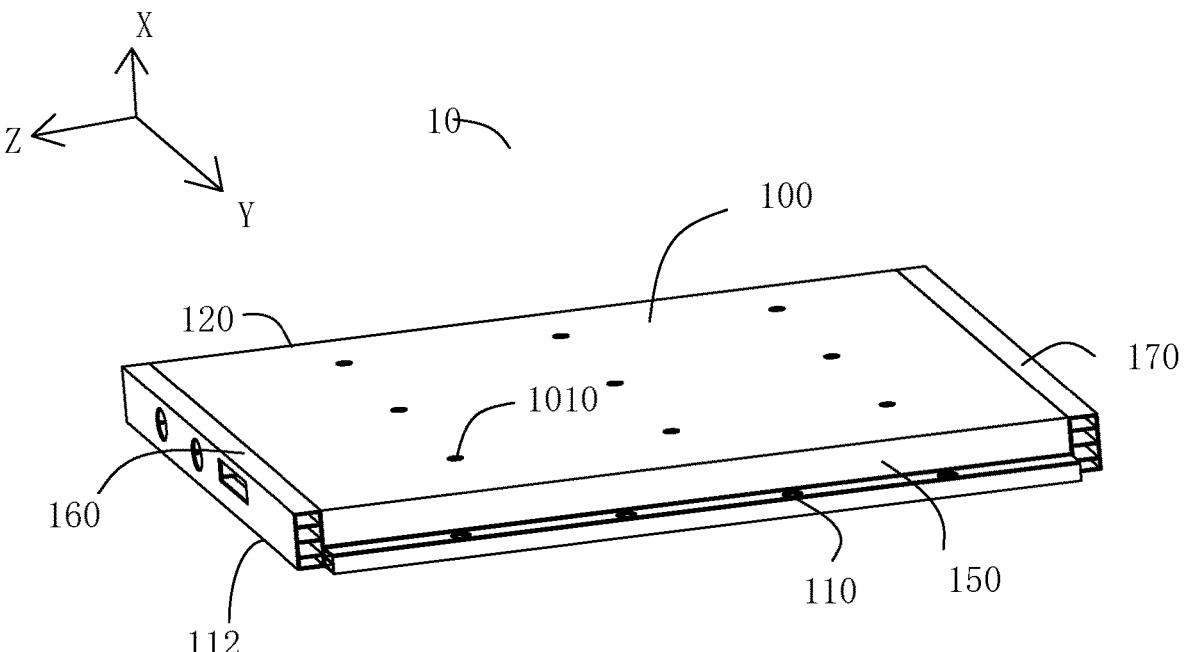
FIG. 1 is a schematic structural view of a battery pack provided in an embodiment of the present disclosure.
Figure 2:
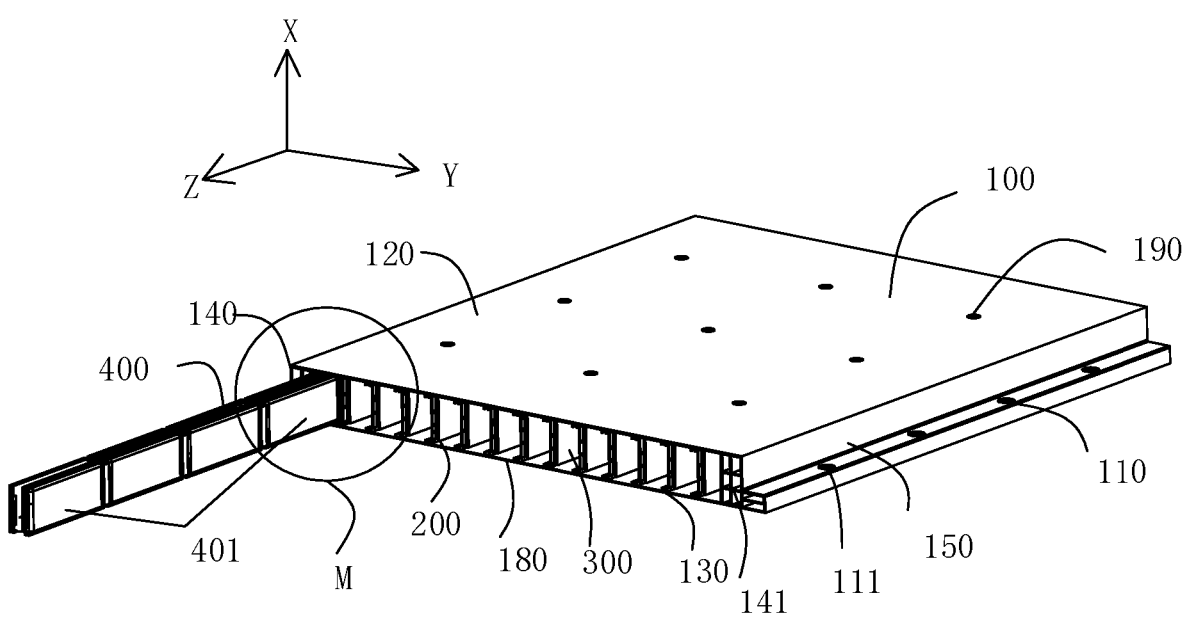
FIG. 2 is a schematic structural view of an electrode core assembly fitting to a housing provided in an embodiment of the present disclosure.
Figure 3:
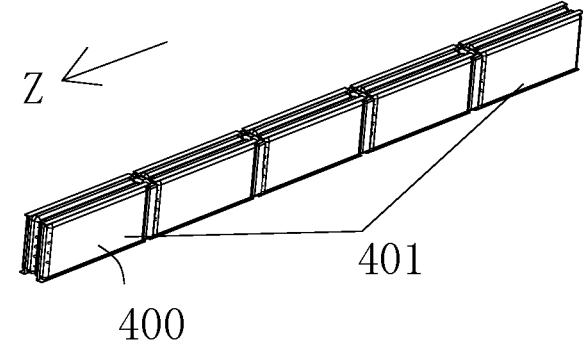
FIG. 3 is a schematic structural view of an electrode core string provided in an embodiment of the present disclosure.
Figure 12:
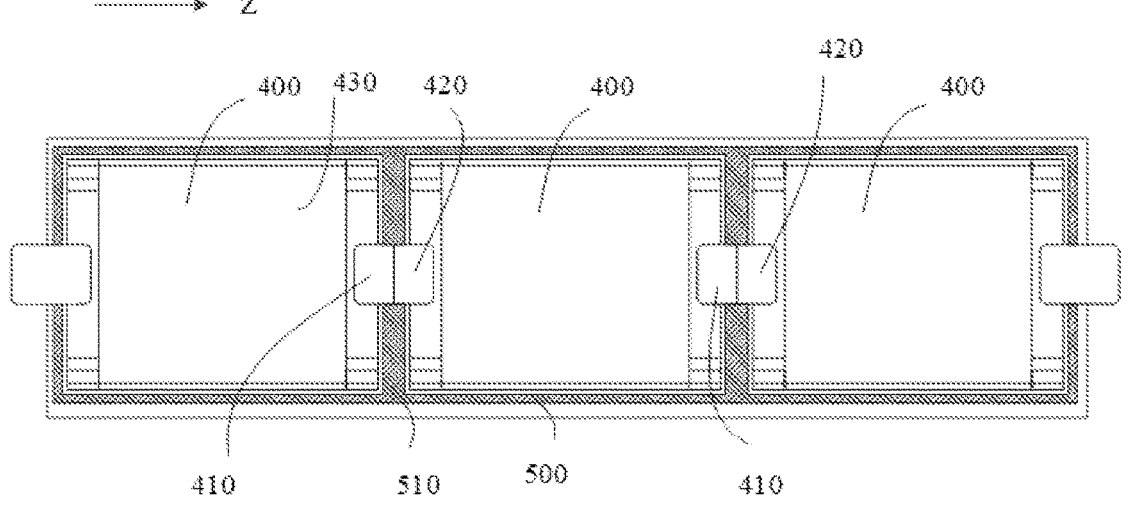
FIG. 12 is a schematic structural view of an encapsulation film encapsulating an electrode core assembly provided in an embodiment of the present disclosure.
Figure 13:
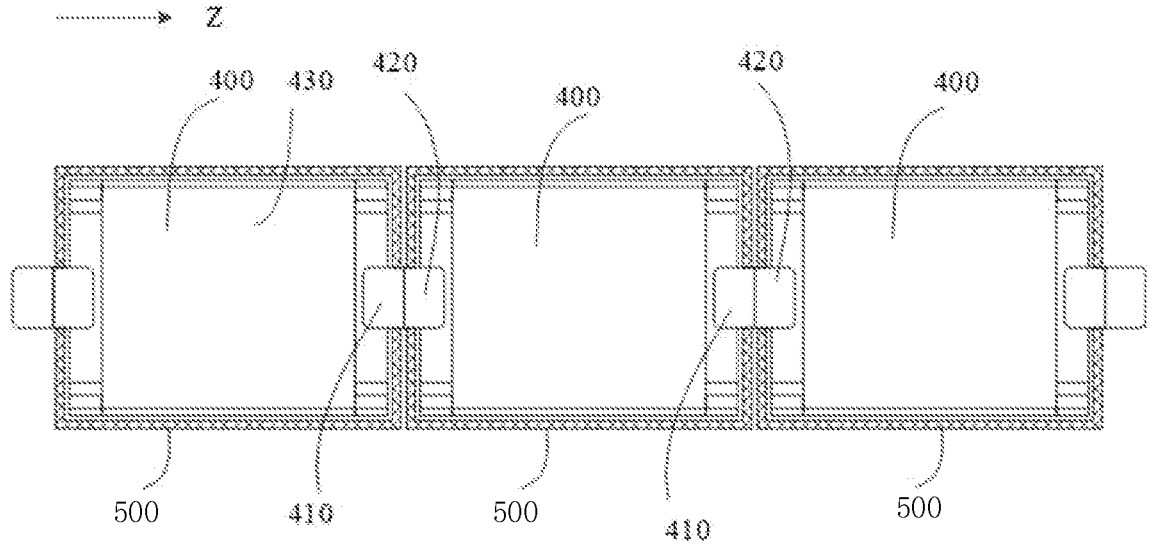
FIG. 13 is a schematic structural view of an encapsulation film encapsulating an electrode core assembly provided in another embodiment of the present disclosure.

Referring to FIGS. 1 to 3, an embodiment of the present disclosure provides a battery pack 10. The battery pack 10 includes a housing, and at least one structural beam 200 (as shown in FIG. 2) and multiple electrode core strings 401 electrically connected to one another, which are located in the housing. The housing includes a housing body 100, and the housing body 100 includes a top plate 120 and a bottom plate 130 arranged opposite to each other in a first direction, where the first direction is a height direction of the housing. The structural beam 200 is located between the top plate 120 and the bottom plate 130. The at least one structural beam 200 is connected to the top plate 120 and the bottom plate 130, the at least one structural beam 200 divides the interior of the housing into multiple accommodating cavities 300, and at least one electrode core string 401 is provided in at least one accommodating cavity 300. Amounting portion 110 is provided on the housing, where the mounting portion 110 is configured to be connected and fixed to an external load. The electrode core string 401 includes multiple electrode core assemblies 400 sequentially disposed in a second direction and connected in series. The electrode core assembly 400 is encapsulated in an encapsulation film 500 (as shown in FIG. 12 or 13); and a length direction of the electrode core string 401 extends in the second direction, where the second direction is a width direction of the housing or the second direction is a length direction of the housing. The first direction is the X direction and the second direction is the Z direction in the figure.

In the present disclosure, the electrode core string 401 is adopted, in which the structures for fixing the battery casing and the battery module in related art are omitted. This improves the space utilization of the battery pack 10, reduces the weight of the battery pack 10, and improve the energy density of the battery pack 10. Moreover, the structure of the battery pack 10 of the present disclosure is simple, and the assembly efficiency is high, thus reducing the production cost. Furthermore, in the housing of the battery pack 10 provided in the present disclosure, the structural beam 200 is located between the top plate 120 and the bottom plate 130, and the structural beam 200 is connected to the top plate 120 and the bottom plate 130. Using such a design, the structural beam 200, the top plate 120 and the bottom plate 130 form a " $\mathbb{I}$ "-shaped structure. This structure has high strength and rigidity, to meet the requirements of the housing of the battery pack 10 for load-bearing capacity, impact resistance and extrusion resistance. Moreover, the structure of the housing of the battery pack 10 provided in the present disclosure is simple, the production cost is low, and the space utilization rate is high. In addition, the structural beam 200 divides the housing into multiple accommodating cavities 300. When thermal runaway occurs to a battery core assembly or cell in one of the accommodating cavities 300, other accommodating cavities 300 will not be affected, thus improving the safety of the battery pack 10 during operation. Moreover, when this battery pack 10 is mounted on a vehicle, the structural strength of the battery pack 10 provides part of the structural strength of the vehicle, to improve the structural strength of the vehicle, contribute to the design requirement of lightweight of the electric vehicle, and reduce the design and manufacturing costs of the vehicle.

In the present disclosure, the electrode core assembly 400 includes at least one electrode core. When the electrode core assembly 400 includes two or more electrode cores, the electrode cores are connected in parallel.

The electrode core mentioned in the present disclosure is an electrode core commonly used in the field of power batteries, and the electrode core and the electrode core assembly 400 are components of the battery, and cannot be understood as the battery itself; In addition, the electrode core can be a wound electrode core, or a stacked electrode core. Generally, the electrode core at least includes a positive electrode sheet, a separator, and a negative electrode sheet.

Further, the structural beam 200 is connected to the top plate 120 and the bottom plate 130. It can be understood that the structural beam 200 may be formed integrally with the top plate 120 and the bottom plate 130; or the structural beam 200, the top plate 120 and the bottom plate 130 are fabricated separately, and then connected directly or indirectly, which is not particularly limited in the present disclosure. The direct connection may be a situation where one end of the structural beam 200 is connected to the bottom plate 130, and the opposite other end of the structural beam 200 is connected to the top plate 120. For example, one end of the structural beam 200 is welded to the bottom plate 130, and then the opposite other end of the structural beam 200 is welded to the top plate 120. The indirect connection may be a situation where one end of the structural beam 200 is connected to the bottom plate 130 via an intermediate plate, and the opposite other end of the structural beam 200 is connected to the top plate 120 via an intermediate plate.

In some embodiments, the at least one structural beam 200 is joined to the top plate 120 and the bottom plate 130. It can be understood that the top plate 120, the bottom plate 130 and the structural beam 200 are integrally formed; or one of the top plate 120 and the bottom plate 130 is integrally formed with the structural beam 200, and then the other one is welded to the structural beam 200; or one end of the structural beam 200 is welded to the bottom plate 130, and then the opposite other end of the structural beam 200 is welded to the top plate 120.

It should be noted that multiple electrode core strings 401 being electrically connected to one another may be that the electrode core strings 401 in two adjacent accommodating cavities 300 are connected in series or in parallel; or the electrode core strings 401 in two spaced accommodating cavities 300 are connected in series or in parallel; or the electrode core strings 401 in three or more accommodating cavities 300 are connected in series or in parallel.

In addition, the number of electrode core strings 401 in each accommodating cavity 300, and the number of electrode core assemblies 400 contained in each electrode core string 401 can be designed according to different power demands. Moreover, the number of electrode core strings 401 in each accommodating cavity 300 may be the same or different. When multiple electrode core strings 401 are arranged in the accommodating cavity 300, the electrode core strings 401 may be connected in series, in parallel or in a hybrid pattern.

Furthermore, a mounting portion 110 is provided on the housing of the battery pack 10 according to the present disclosure. The housing of the battery pack 10 is detachably or non-detachably and fixedly connected to an external load through the mounting portion provided thereon. Generally, the housing of the battery pack 10 needs to be fixedly connected to an external load, and thus has special requirements in terms of the impact resistance, extrusion resistance and other performance, so it cannot simply be equivalent to the casing of a battery module or cell. Generally, the battery pack 10 also includes at least one of a battery management system (BMS), a battery connector, a battery sampler and a battery thermal management system.

In an embodiment, a length of the accommodating cavity 300 in the second direction is 500 mm or greater, and further, the length of the accommodating cavity 300 in the second direction is 500 mm-2500 mm. Such a design allows the electrode core string 401 arranged in the accommodating cavity 300 to have a higher length, to accommodate more electrode core assemblies 400, and enable the battery pack 10 to meet the requirements of high capacity and high space utilization rate.

Further, the length of the accommodating cavity 300 in the second direction is 1000 mm-2000 mm.

Further, the length of the accommodating cavity 300 in the second direction is 1300 mm-2200 mm.

In an embodiment, as shown in FIG. 2, multiple structural beams 200 are provided. The multiple structural beams 200 are spaced in a third direction, and the length of the structural beam 200 extends in the second direction, where the third direction is different from the first direction and the second direction. The multiple structural beams 200 are connected to the top plate 120 and the bottom plate 130.

In the present disclosure, the first direction is the height direction of the housing, the second direction is the width direction of the housing, and the third direction is the length direction of the housing; or the second direction is the length direction of the housing, and the third direction is the width direction of the housing. The first direction is the X direction, the second direction is the Z direction, and the third direction is the Y direction in the figure.

However, in other embodiments, any two of the first direction, the second direction and the third direction may also be arranged at other angles, for example, 80° or 85°, which is not particularly limited in the present disclosure.

It should be noted that the structural beam 200 is connected to the top plate 120 and the bottom plate 130. It can be understood that the structural beam 200 may be formed integrally with the top plate 120 and the bottom plate 130; or the structural beam 200, the top plate 120 and the bottom plate 130 are fabricated separately, and then connected directly or indirectly, which is not particularly limited in the present disclosure.

In an embodiment, the housing body 100 is integrally formed with the structural beam 200. Such an arrangement has simple processing process and reduced production cost, and also ensures that the housing has sufficient structural strength and rigidity, to meet the requirements of the housing for load-bearing capacity, impact resistance and extrusion resistance.

Specifically, the top plate 120, the bottom plate 130 and the structural beam 200 are integrally formed. In another embodiment, the bottom plate 130 and the structural beam 200 are integrally formed, and then the top plate 120 is welded to the structural beam 200. Alternatively, the top plate 120 and the structural beam 200 are integrally formed, and then the bottom plate 130 is welded to the structural beam 200.

It can be understood that when multiple structural beams 200 are connected to the top plate 120 and the bottom plate 130, each structural beam 200 forms, together with the top plate 120 and the bottom plate 130, " ⊥ "-shaped structure. This structure has high strength and rigidity, to meet the requirements of the housing for load-bearing capacity, impact resistance and extrusion resistance. Moreover, the housing has relatively simple structure, and high space utilization rate. Furthermore, the housing body 100 is integrally formed with the structural beam 200, and thus has simple processing process and reduced production cost. When this battery pack 10 is mounted on the vehicle, the structural strength of the battery pack 10 provides part of the structural strength of the vehicle, to improve the structural strength of the vehicle, help to meet the design requirement of lightweight of the electric vehicle, and reduce the design and manufacturing costs of the vehicle.

In an embodiment, as shown in FIG. 1 and FIG. 2, the housing body 100 further includes a first side frame 140 and a second side frame 150 arranged at two sides of the housing body 100 in the third direction. The second direction is the length direction of the housing, and the third direction is the width direction of the housing. Alternatively, the second direction is the width direction of the housing, and the third direction is the length direction of the housing.

Specifically, the housing body 100 includes the top plate 120 and the bottom plate 130 arranged opposite to each other in the first direction, and the first side frame 140 and the second side frame 150 arranged opposite to each other in the third direction. The top plate 120, the first side frame 140, the bottom plate 130, and the second side frame 150 are connected.

It should be noted that the top plate 120, the first side frame 140, the bottom plate 130 and the second side frame 150 may be connected directly or indirectly. It can be understood that the direct connection may be a situation where the top plate 120, the first side frame 140, the bottom plate 130 and the second side frame 150 jointly define an accommodating space, where the structural beam 200 is located in the accommodation space. Preferably, the top plate 120, the first side frame 140, the bottom plate 130 and the second side frame 150 are integrally formed. Such an arrangement ensures a high structural strength of the housing and has a simple processing process and reduced production cost. The top plate 120, the first side frame 140, the bottom plate 130 and the second side frame 150 may also be fabricated separately and then connected. The indirect connection may be, for example, connection via a connecting plate, which is not particularly limited in the present disclosure.

In an embodiment, the top plate 120, the first side frame 140, the bottom plate 130, the second side frame 150 and the structural beam 200 are integrally formed, for example, by extrusion with one-piece aluminum profile. This not only ensures that the housing of the battery pack 10 has high structural strength, but also simplifies the production process and reduces the processing cost.

In one embodiment, the battery pack includes a cavity inside at least one of the first side frame 140 and the second side frame 150, where a strengthening plate 141 is provided, and the strengthening plate 141 divides the cavity into multiple sub-cavities. Such an arrangement ensures that the first side frame 140 and the second side frame 150 have a certain strength, and facilitates the improvement of the impact resistance and anti-extrusion strength of the battery pack 10.

In one embodiment, the first side frame 140 and the second side frame 150 are provided with a mounting portion 110, where the mounting portion 110 is configured to be connected and fixed to an external load.

In other embodiments, the mounting portion 110 may also be provided on the top plate 120 or the bottom plate 130.

In an embodiment, as shown in FIG. 2, the mounting portion 110 is a mounting hole 111 provided on the first side frame 140 and the second side frame 150. The mounting hole 111 is configured for a fastener (such as a bolts or a rivet) to pass therethrough, to fixedly connect the battery pack 10 to an external load.

Specifically, the mounting hole 111 provided on the first side frame 140 penetrates the first side frame 140 in the first direction, and the mounting hole 111 provided on the second side frame 150 penetrates the second side frame 150 in the first direction. However, the axial direction of the mounting hole 111 may also be arranged at an angle with respect to the first direction, for example 5° or 10°.

Further, multiple mounting holes 111 are provided, and the mounting holes 111 provided on the first side frame 140 are arranged in sequence in the length direction of the first side frame 140. The length direction of the first side frame 140 is parallel to the second direction.

Similarly, the mounting holes 111 provided on the second side frame 150 are arranged in sequence in the length direction of the second side frame 150. The length direction of the second side frame 150 is parallel to the second direction.

In another embodiment, the mounting portion 110 is a ring provided on the first side frame 140 and the second side frame 150. The ring is fixedly connected to a vehicle body, to fixedly connect the battery pack 10 to an external load.

However, in another embodiment, the mounting portion 110 is a mounting block arranged on the first side frame 140 and the second side frame 150, where the mounting block is fixed to the vehicle body by welding. The mounting block can also be fixed to an external load by gluing or engaging.

In an embodiment, as shown in FIG. 1 and FIG. 2, the housing body 100 is provided with a first opening 180 at an end in the second direction; and the battery pack 10 further includes an end plate 112 closing the first opening 180. It can be understood that the electrode core string 401 can be passed through the first opening 180 and mounted in the accommodating cavity 300. This mounting method is convenient in operation and ensures a high structural strength of the housing.

Further, the housing body 100 is provided with the first opening 180 at two ends in the second direction; and the end plate 112 includes a third side frame 160 and a fourth side frame 170. The third side frame 160 and the fourth side frame 170 are sealingly connected to the housing body 100 to close the corresponding first opening 180. That is, the third side frame 160 and the fourth side frame 170 are arranged at two ends of the housing body 100 in the second direction, where the third side frame 160 is sealingly connected to the housing body 100 to close the first opening 180 arranged adjacent to the third side frame 160, and the fourth side frame 170 is sealingly connected to the housing body 100 to close the first opening 180 arranged adjacent to the fourth side frame 170. It can be understood that when the housing body 100 is provided with the first opening 180 at two ends in the second direction, a first electrode and a second electrode (that is, the positive electrode and the negative electrode) of the electrode core string 401 located in the accommodating cavity 300 can be led out from the two first openings 180.

Further, the housing body 100, the third side frame 160, and the fourth side frame 170 are metal pieces that are sealingly connected by welding.

However, in other embodiments, the housing body 100, the third side frame 160 and the fourth side frame 170 may also be formed of a plastic. Moreover, both the third side frame 160 and the fourth side frame 170 can be sealingly connected to the housing body 100 by gluing or engaging.

Further, the third side frame 160 and the fourth side frame 170 are an internally hollow structure, where a strengthening plate is provided in the third side frame 160 and the fourth side frame 170, and the strengthening plate divides the internal space of the third side frame 160 and the fourth side frame 170 into multiple sub-cavities. Such an arrangement ensures that the third side frame 160 and the fourth side frame 170 have a certain strength, and facilitates the improvement of the impact resistance and anti-extrusion strength of the housing body of the battery pack 10.

In an embodiment, the battery pack 10 further includes a sealing plate, the accommodating cavity 300 is provided with a second opening at an end in the second direction, the sealing plate is located on an inner side of the end plate, and the sealing plate is connected to the structural beam 200 and the housing body 100, to block a part of the second opening adjacent to the bottom plate 130. That is, the second opening is semi-blocked by the sealing plate, the electrolyte solution flowing from one accommodating cavity 300 to another accommodating cavity 300 when the encapsulation film 500 is accidentally broken, thereby improving the safety performance of the battery pack 10 during use.

The semi-blocking of the second openings of the accommodating cavities 300 at two ends of the multiple accommodating cavities 300 may be such that the sealing plate is sealingly connected to the first side frame 140, the bottom plate 130 and the structural beam 200, or the sealing plate is connected to the second side frame 150, the bottom plate 130 and the structural beam 200, to block a part of the second openings of the accommodating cavities 300 adjacent to the bottom plate 130.

The semi-blocking of the second openings of the remaining accommodating cavities 300, other than the accommodating cavities 300 at two sides, in the multiple accommodating cavities 300 may be such that the sealing plate is connected to the bottom plate 130 and two adjacent structural beams 200, to block a part of the second openings of the accommodating cavities 300 adjacent to the bottom plate 130.

In an embodiment, the battery pack 10 further includes a sealing plate, the accommodating cavity is provided with a second opening at an end in the second direction, the sealing plate is located on an inner side of the end plate, and the sealing plate is connected to the structural beam 200 and the housing body 100, to completely block the second opening of the accommodating cavity 300. That is, the second opening of the accommodating cavity 300 is completely blocked by the sealing plate, to further improve the safety performance of the battery pack 10 during use.

The complete blocking of the second openings of the accommodating cavities 300 at two ends of the multiple accommodating cavities 300 may be such that the sealing plate is connected to the first side frame 140, the structural beam 200, the top plate 120 and the bottom plate 130, or the sealing plate is connected to the second side frame 150, the structural beam 200, the top plate 120 and the bottom plate 130, to completely block the second openings of the accommodating cavities 300.

The complete blocking of the second openings of the remaining accommodating cavities 300, other than the accommodating cavities 300 at two sides, in the multiple accommodating cavities 300 may be such that the sealing plate is connected to the bottom plate 130, the top plate 120 and two adjacent structural beams 200, to completely block the second openings of the accommodating cavities 300.

In an embodiment, as shown in FIG. 2 and FIG. 3, the electrode core string 401 has a length of 400 mm or greater. Further, the electrode core string 401 has a length of 400 mm-2500 mm. Further, the electrode core string 401 has a length of 1000 mm-2000 mm. Further, the electrode core string 401 has a length of 1300 mm-2200 mm. It can be understood that an electrode core string 401 formed by multiple electrode core assemblies 400 connected in series is arranged in the accommodating cavity 300, which reduces the internal resistance compared with the situation where only one electrode core assembly 400 of the same length as the electrode core string 401 is arranged in the related art. Because as the length of the electrode core assembly 400 increases, the length of a copper and an aluminum foil used as a current collector will increase accordingly, which greatly increases the internal resistance. Therefore, the increasingly high power and fast charging requirements cannot be met. The above-mentioned problems can be avoided by using the multiple electrode core assemblies 400 connected in series provided in the present disclosure.

Figure 4A:
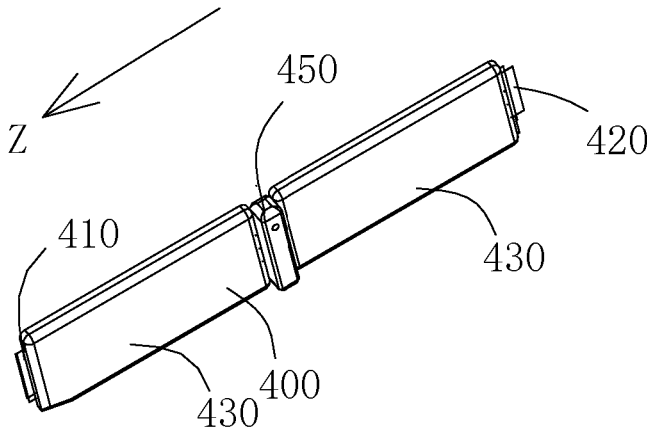
FIG. 4A is a schematic structural view showing the connection of an electrode core assembly with a fixing intermediate ring provided in an embodiment of the present disclosure.
Figure 4B:
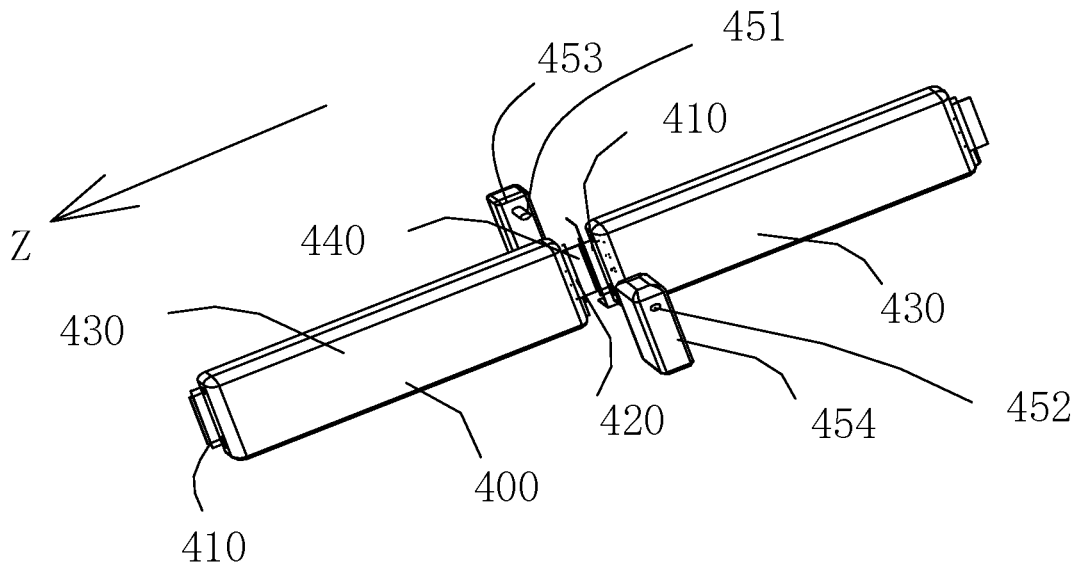
FIG. 4B is an exploded perspective view showing the connection of an electrode core assembly with a fixing intermediate ring provided in an embodiment of the present disclosure.

Referring to FIGS. 4A and 4B, in one embodiment, the electrode core assembly 400 includes a first electrode lead-out member 410 and a second electrode lead-out member 420 for current output. The first electrode lead-out member 410 and the second electrode lead-out member 420 are arranged at two opposite sides of the electrode core assembly 400 in the second direction. The first electrode lead-out member 410 of one electrode core assembly 400 of two adjacent electrode core assemblies 400 is electrically connected to the second electrode lead-out member 420 of the other electrode core assembly 400, to serially connect two adjacent electrode core assemblies 400. That is, the electrode core assemblies 400 are arranged head-to-tail. Such an arrangement is convenient for the serial connection between the electrode core assemblies 400, and the connected structure is simple.

In an embodiment, as shown in FIG. 2, when multiple electrode core strings 401 are arranged in the accommodating cavity 300, the multiple electrode core strings 401 are sequentially arranged and electrically connected in a thickness direction of the electrode core assembly 400, where the thickness direction of the electrode core assembly 400 is parallel to the third direction. As such, it is possible to arrange more electrode core strings 401 in the accommodating cavity 300, to meet the actual needs during use.

Several situations of electrical connection of multiple electrode core strings 401 in the same accommodating cavity 300 are specifically described below. It should be noted that the following description is merely exemplary, and the embodiments of the present disclosure are not limited thereto.

Figure 5:
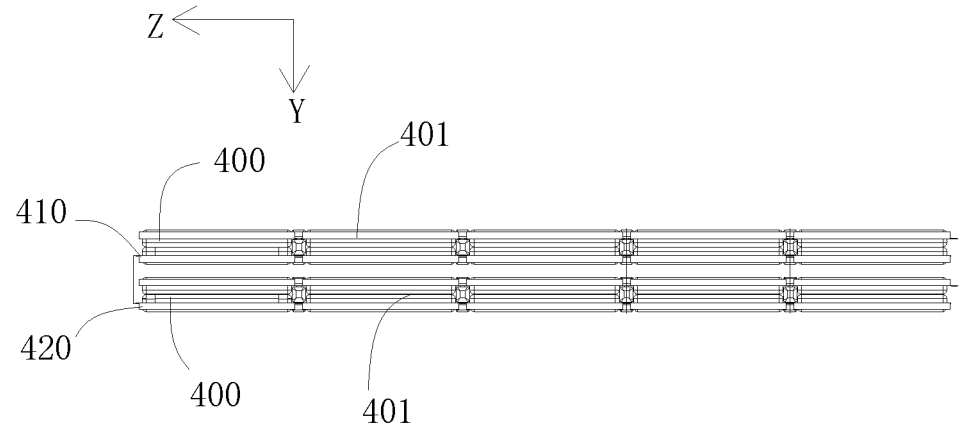
FIG. 5 is a schematic structural view showing two electrode core strings connected in series in a same accommodating cavity provided in an embodiment of the present disclosure.
Figure 6:
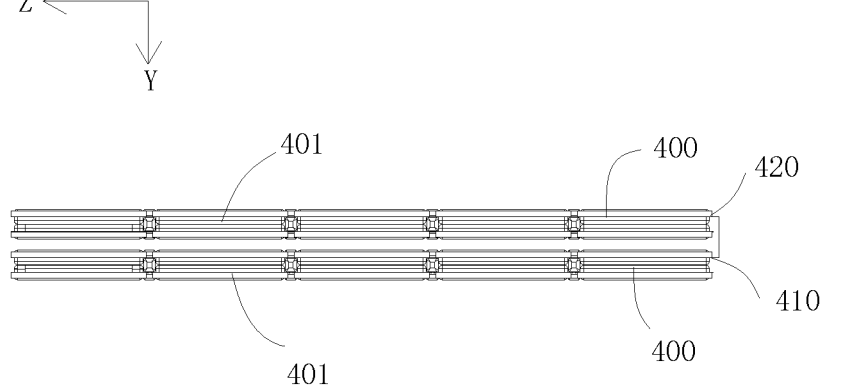
FIG. 6 is another schematic structural view showing two electrode core strings connected in series in a same accommodating cavity provided in an embodiment of the present disclosure.

Referring to FIGS. 5 and 6, in one embodiment, the multiple electrode core strings 401 in the same accommodating cavity 300 are connected in series.

The first electrode core assembly 400 in one electrode core string 401 of two adjacent electrode core strings 401 is electrically connected to the first electrode core assembly 400 in the other electrode core string 401. Alternatively, the last electrode core assembly 400 in one electrode core string 401 of two adjacent electrode core strings 401 is electrically connected to the last electrode core assembly 400 in the other electrode core string 401. As shown in FIGS. 5 and 6, the left most electrode core assembly in the two electrode core strings 401 is the electrode core assembly 400, and the right most electrode core assembly is the last electrode core assembly 400.

Further, the first electrode lead-out member 410 of the first electrode core assembly 400 in one electrode core string 401 of two adjacent electrode core strings 401 and the second electrode lead-out member 420 of the first electrode core assembly 400 in the other electrode core string 401 are located at the same side (as shown in FIG. 5). Alternatively, the second electrode lead-out member 420 of the last electrode core assembly 400 in one electrode core string 401 of two adjacent electrode core strings 401 and the first electrode lead-out member 410 of the last electrode core assembly 400 in the other electrode core string 401 are located at the same side (as shown in FIG. 6).

The wiring space of the connection wires can be saved by the above-described pattern of serial connection of the electrode core strings 401 in the same accommodating cavity 300. In other embodiments, other patterns of serial connection may also be adopted.

Figure 7:
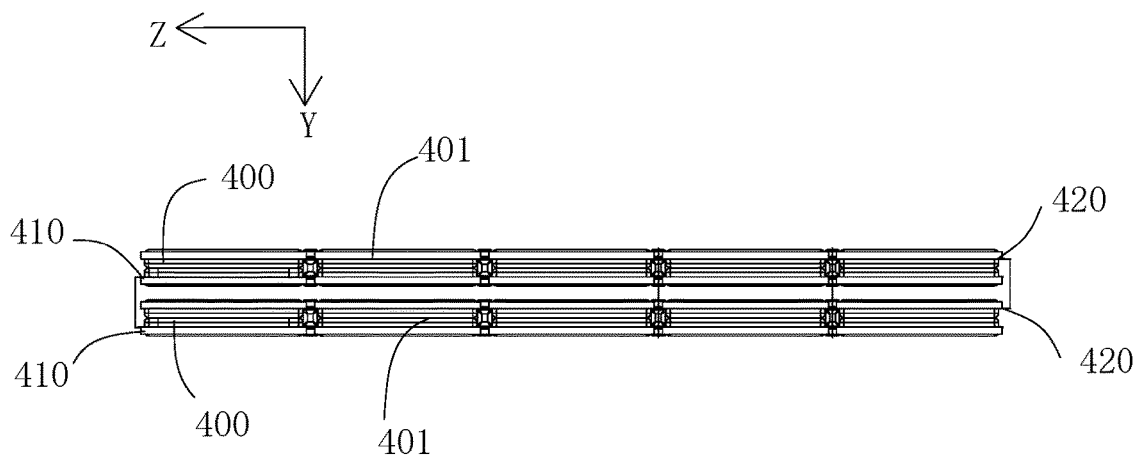
FIG. 7 is a schematic structural view showing two electrode core strings connected in parallel in a same accommodating cavity provided in an embodiment of the present disclosure.

Referring to FIG. 7, in one embodiment, multiple electrode core strings 401 in the same accommodating cavity 300 are connected in parallel.

The first electrode core assembly 400 in one electrode core string 401 of two adjacent electrode core strings 401 is electrically connected to the first electrode core assembly 400 in the other electrode core string 401, and the last electrode core assembly 400 in one electrode core string 401 of two adjacent electrode core strings 401 is electrically connected to the last electrode core assembly 400 in the other electrode core string 401. As shown in FIG. 7, the left most electrode core assembly in the two electrode core strings 401 is the electrode core assembly 400, and the right most electrode core assembly is the last electrode core assembly 400.

Specifically, the first electrode lead-out member 410 of the first electrode core assembly 400 in one electrode core string 401 of two adjacent electrode core strings 401 and the first electrode lead-out member 410 of the first electrode core assembly 400 in the other electrode core string 401 are located at the same side, and the second electrode lead-out member 420 of the last electrode core assembly 400 in one electrode core string 401 of two adjacent electrode core strings 401 and the second electrode lead-out member 420 of the last electrode core assembly 400 in the other electrode core string 401 are located at the same side.

The wiring space of the connection wires can be saved by the above-described pattern of parallel connection of the electrode core strings 401 in the same accommodating cavity 300. In other embodiments, other patterns of parallel connection may also be adopted.

Further, several situations of electrical connection of electrode core strings 401 in two adjacent accommodating cavities 300 are specifically described below. It should be noted that the following description is merely exemplary, and the embodiments of the present disclosure are not limited thereto.

Figure 8:
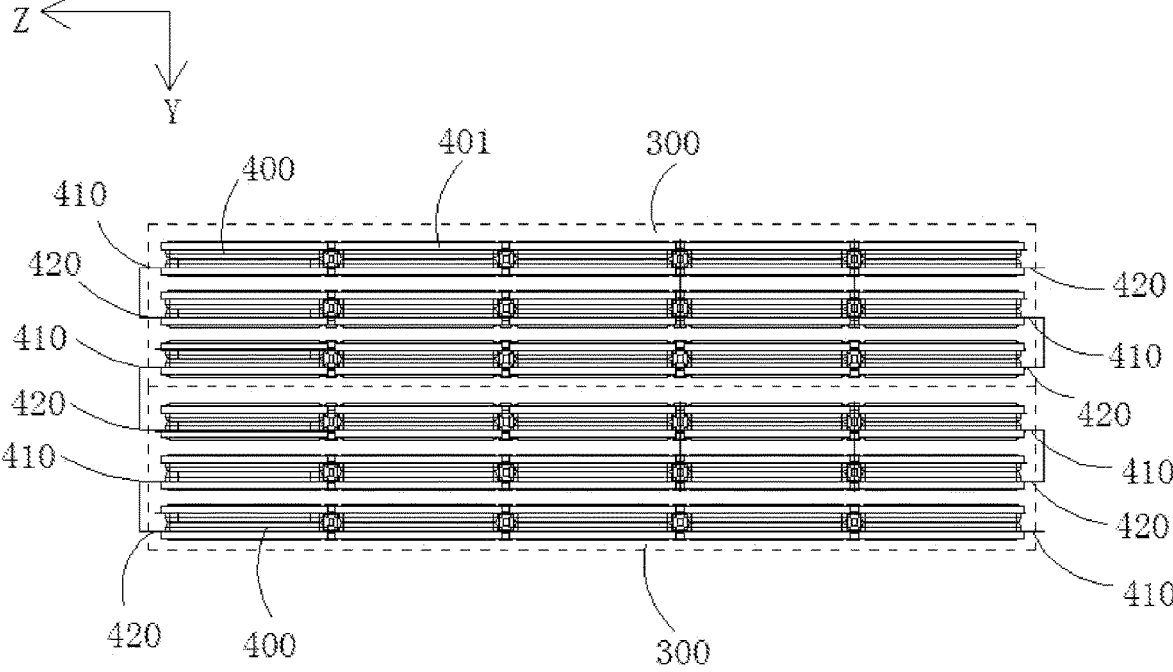
FIG. 8 is a schematic structural view showing two electrode core strings connected in series in two accommodating cavities provided in an embodiment of the present disclosure.

Referring to FIG. 8, in one embodiment, the electrode core strings 401 in two adjacent accommodating cavities 300 are connected in series.

The first electrode core assembly 400 of one electrode core string 401 in one accommodating cavity 300 of two adjacent accommodating cavities 300 is electrically connected to the first electrode core assembly 400 of one electrode core string 401 in the other accommodating cavity 300. Alternatively, the last electrode core assembly 400 of one electrode core string 401 in one accommodating cavity 300 of two adjacent accommodating cavities 300 is electrically connected to the last electrode core assembly 400 of one electrode core string 401 in the other accommodating cavity 300. In FIG. 8, the first electrode core assembly 400 of the electrode core string 401 is the left most electrode core assembly 400, and the last electrode core assembly 400 of the electrode core string 401 is the right most electrode core assembly 400. Alternatively, the first electrode core assembly 400 of the electrode core string 401 is the right most electrode core assembly 400, and the last electrode core assembly 400 of the electrode core string 401 is the left most electrode core assembly 400. In FIG. 8, a situation where three electrode core strings 401 are included in each accommodating cavity 300 is shown, in which two electrode core strings 401 at spaced closest positions in two accommodating cavities 300 are electrically connected. In other embodiments, the accommodating cavity 300 may include one or other number (different from 3) of electrode core strings 401. When the accommodating cavity 300 includes multiple electrode core strings 401, the first electrode core string 401 in one accommodating cavity 300 in the third direction is electrically connected to the second electrode core string 401 in the other accommodating cavity 300 in the third direction. That is to say, two electrode core strings 401 other than the ones at spaced closest positions in two accommodating cavities 300 are electrically connected.

In one embodiment, the first electrode lead-out member 410 of the first electrode core assembly 400 of one electrode core string 401 in one accommodating cavity 300 of two adjacent accommodating cavities 300 and the second electrode lead-out member 420 of the first electrode core assembly 400 of one electrode core string 401 in the other accommodating cavity 300 are located at the same side.

Alternatively, the first electrode lead-out member 410 of the last electrode core assembly 400 of one electrode core string 401 in one accommodating cavity 300 of two adjacent accommodating cavities 300 and the second electrode lead-out member 420 of the last electrode core assembly 400 of one electrode core string 401 in the other accommodating cavity 300 are located at the same side.

The wiring space of the connection wires can be saved by the above-described pattern of serial connection of the electrode core strings 401 in two adjacent accommodating cavities 300. In other embodiments, other patterns of serial connection may also be adopted.

In some preferred embodiments, two adjacent accommodating cavities 300 are respectively defined as a first accommodating cavity 300 and a second accommodating cavity 300, and an electrode core string 401 provided in the first accommodating cavity 300 adjacent to the second accommodating cavity 300 is connected in series with an electrode core string 401 provided in the second accommodating cavity 300 adjacent to the first accommodating cavity 300.

Specifically, the first electrode core assembly 400 of one electrode core string 401 provided in the first accommodating cavity 300 adjacent to the second accommodating cavity 300 is electrically connected to the first electrode core assembly 400 of one electrode core string 401 provided in the second accommodating cavity 300 adjacent to the first accommodating cavity 300.

Alternatively, the last electrode core assembly 400 of one electrode core string 401 provided in the first accommodating cavity 300 adjacent to the second accommodating cavity 300 is electrically connected to the last electrode core assembly 400 of one electrode core string 401 provided in the second accommodating cavity 300 adjacent to the first accommodating cavity 300.

It can be understood that the wiring space of the connection wires can be saved by the above-described pattern of connection.

Figure 9:
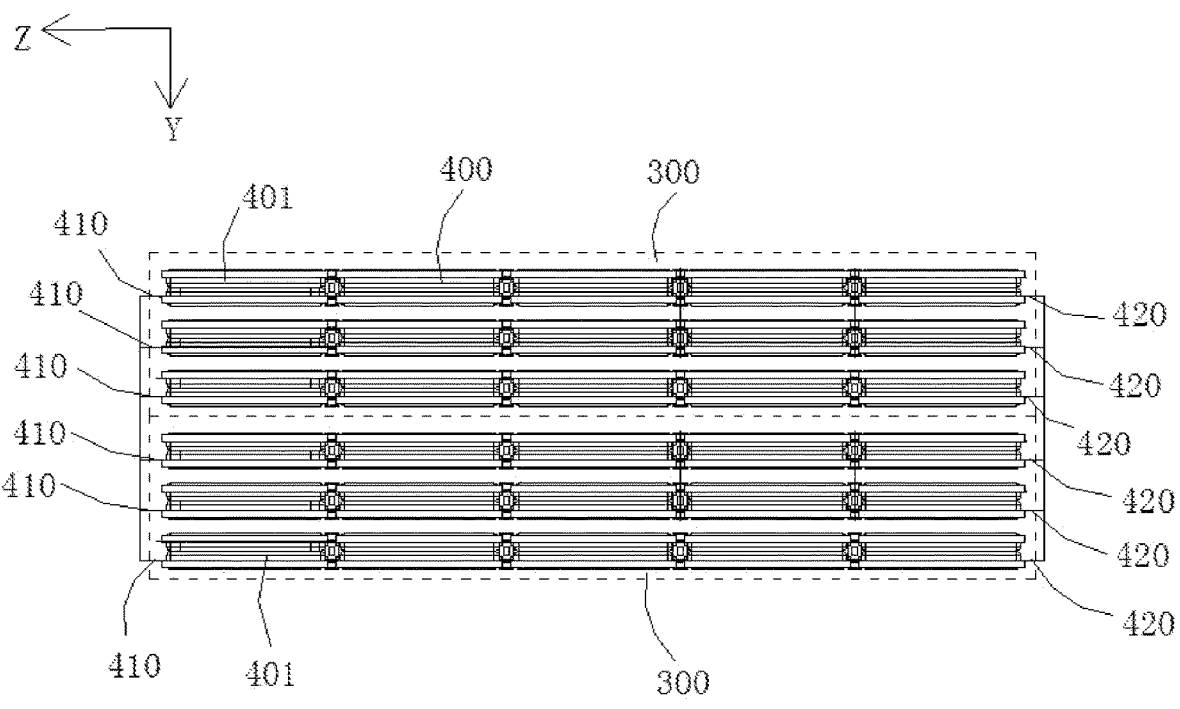
FIG. 9 is a schematic structural view showing two electrode core strings connected in parallel in two accommodating cavities provided in an embodiment of the present disclosure.

Referring to FIG. 9, in one embodiment, the electrode core strings 401 in two adjacent accommodating cavities 300 are connected in parallel.

The first electrode core assembly 400 of one electrode core string 401 in one accommodating cavity 300 of two adjacent accommodating cavities 300 is electrically connected to the first electrode core assembly 400 of one electrode core string 401 in the other accommodating cavity 300, and the last electrode core assembly 400 of one electrode core string 401 in one accommodating cavity 300 of two adjacent accommodating cavities 300 is electrically connected to the last electrode core assembly 400 of one electrode core string 401 in the other accommodating cavity 300. In FIG. 9, the first electrode core assembly 400 of the electrode core string 401 is the left most electrode core assembly 400, and the last electrode core assembly 400 of the electrode core string 401 is the right most electrode core assembly 400. Alternatively, the first electrode core assembly 400 of the electrode core string 401 is the right most electrode core assembly 400, and the last electrode core assembly 400 of the electrode core string 401 is the left most electrode core assembly 400.

Specifically, the first electrode lead-out member 410 of the first electrode core assembly 400 of one electrode core string 401 in one accommodating cavity 300 of two adjacent accommodating cavities 300 and the first electrode lead-out member 410 of the first electrode core assembly 400 of one electrode core string 401 in the other accommodating cavity 300 are located at the same side, and the second electrode lead-out member 420 of the last electrode core assembly 400 of one electrode core string 401 in one accommodating cavity 300 of two adjacent accommodating cavities 300 and the second electrode lead-out member 420 of the last electrode core assembly 400 of one electrode core string 401 in the other accommodating cavity 300 are located at the same side.

The wiring space of the connection wires can be saved by the above-described pattern of parallel connection of the electrode core strings 401 in two adjacent accommodating cavities 300. In other embodiments, other patterns of parallel connection may also be adopted.

Preferably, two adjacent accommodating cavities 300 are respectively defined as a first accommodating cavity 300 and a second accommodating cavity 300, and an electrode core string 401 provided in the first accommodating cavity 300 adjacent to the second accommodating cavity 300 is connected in parallel with an electrode core string 401 provided in the second accommodating cavity 300 adjacent to the first accommodating cavity 300.

Specifically, the first electrode core assembly 400 of one electrode core string 401 provided in the first accommodating cavity 300 adjacent to the second accommodating cavity 300 is electrically connected to the first electrode core assembly 400 of one electrode core string 401 provided in the second accommodating cavity 300 adjacent to the first accommodating cavity 300, and the last electrode core assembly 400 of one electrode core string 401 provided in the first accommodating cavity 300 adjacent to the second accommodating cavity 300 is electrically connected to the last electrode core assembly 400 of one electrode core string 401 provided in the second accommodating cavity 300 adjacent to the first accommodating cavity 300. It can be understood that the wiring space of the connection wires can be saved by the above-described pattern of connection.

In the case where each accommodating cavity 300 is provided with one electrode core string 401 therein, the pattern of connection of the electrode core strings 401 in two adjacent accommodating cavities 300 is similar to those as described above, and is only described briefly below.

Figure 10:
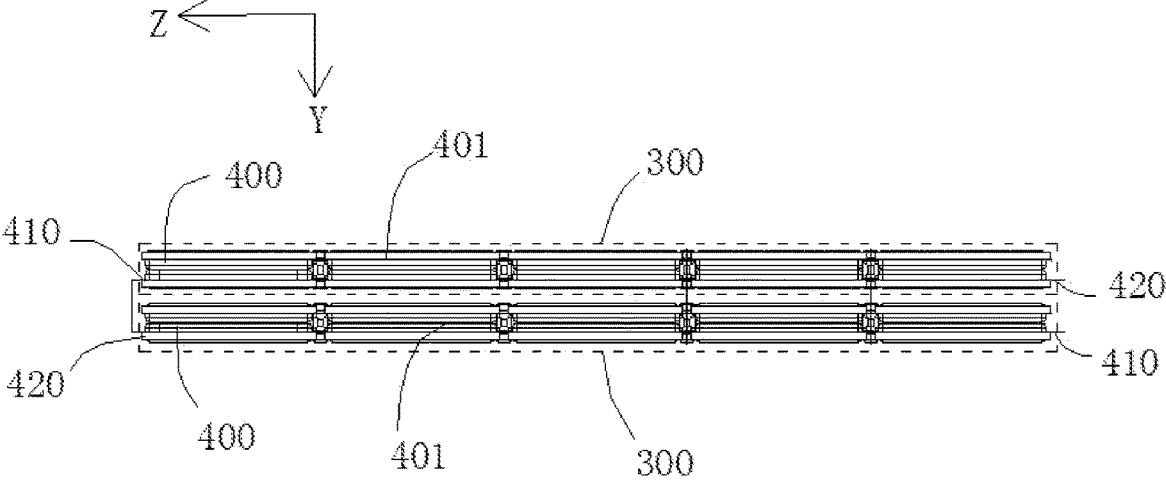
FIG. 10 is another schematic structural view showing two electrode core strings connected in series in two accommodating cavities provided in an embodiment of the present disclosure.

In some embodiments, as shown in FIG. 10, only one electrode core string 401 is arranged in the accommodating cavity 300. In this case, the electrode core assemblies 400 in two adjacent accommodating cavities 300 are serially connected in a pattern in which the first electrode core assembly 400 of the electrode core string 401 in one accommodating cavity 300 of two adjacent accommodating cavities 300 is electrically connected to the first electrode core assembly 400 of the electrode core string 401 in the other accommodating cavity 300; or the last electrode core assembly 400 of the electrode core string 401 in one accommodating cavity 300 of two adjacent accommodating cavities 300 is electrically connected to the last electrode core assembly 400 of the electrode core string 401 in the other accommodating cavity 300. In FIG. 10, the first electrode core assembly 400 of the electrode core string 401 is the left most electrode core assembly 400, and the last electrode core assembly 400 of the electrode core string 401 is the right most electrode core assembly 400. Alternatively, the first electrode core assembly 400 of the electrode core string 401 is the right most electrode core assembly 400, and the last electrode core assembly 400 of the electrode core string 401 is the left most electrode core assembly 400.

Figure 11:
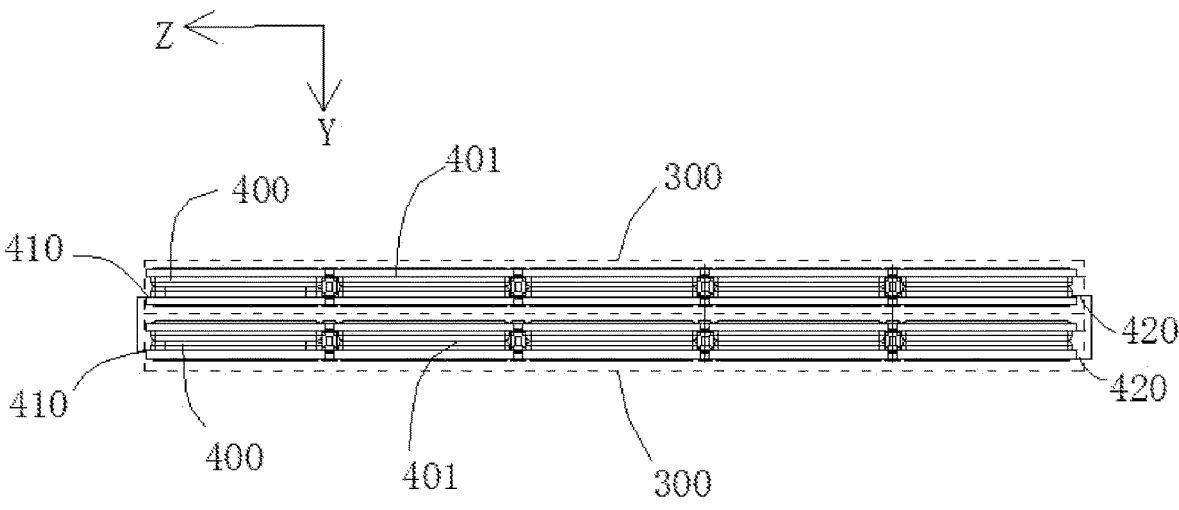
FIG. 11 is another schematic structural view showing two electrode core strings connected in parallel in two accommodating cavities provided in an embodiment of the present disclosure.

In some embodiments, as shown in FIG. 11, only one electrode core string 401 is arranged in the accommodating cavity 300. In this case, the electrode core assemblies 400 in two adjacent accommodating cavities 300 are connected in parallel in a pattern in which the first electrode core assembly 400 of the electrode core string 401 in one accommodating cavity 300 of two adjacent accommodating cavities 300 is electrically connected to the first electrode core assembly 400 of the electrode core string 401 in the other accommodating cavity 300, and the last electrode core assembly 400 of the electrode core string 401 in one accommodating cavity 300 of two adjacent accommodating cavities 300 is electrically connected to the last electrode core assembly 400 of the electrode core string 401 in the other accommodating cavity 300. In FIG. 11, the first electrode core assembly 400 of the electrode core string 401 is the left most electrode core assembly 400, and the last electrode core assembly 400 of the electrode core string 401 is the right most electrode core assembly 400. Alternatively, the first electrode core assembly 400 of the electrode core string 401 is the right most electrode core assembly 400, and the last electrode core assembly 400 of the electrode core string 401 is the left most electrode core assembly 400.

Referring to FIGS. 4A and 4B, in one embodiment, the electrode core assembly 400 includes an electrode core assembly body 430, and a first electrode lead-out member 410 and a second electrode lead-out member 420 for current output. The first electrode lead-out member 410 and the second electrode lead-out member 420 are arranged at two opposite sides of the electrode core assembly body 430 in the second direction. The first electrode lead-out member 410 of one electrode core assembly 400 of two adjacent electrode core assemblies 400 is electrically connected to the second electrode lead-out member 420 of the other electrode core assembly 400 via a first electrically conductive member 440.

A fixing intermediate ring 450 is arranged between the electrode core assembly bodies 430 of two adjacent electrode core assemblies 400, where the first electrically conductive member 440 is fixed in the fixing intermediate ring 450. A structural adhesive is filled between the electrode core assembly bodies 430 of two adjacent electrode core assemblies 400 and the fixing intermediate ring 450. In this way, multiple electrode core assemblies 400 can be connected into one piece through the structural adhesive, thus improving the structural strength of the electrode core string 401, to facilitate the mounting of the electrode core string 401 in the accommodating cavity 300.

The fixing intermediate ring 450 includes a first intermediate ring 453 and a second intermediate ring 454 arranged opposite to each other in the third direction. The first electrically conductive member 440 is located between the first intermediate ring 453 and the second intermediate ring 454, and the first intermediate ring 453 and the second intermediate ring 454 are connected to clamp and fix the first electrically conductive member 440, so as to avoid the movement between the electrode core assemblies 400.

In an embodiment, one of the first intermediate ring 453 and the second intermediate ring 454 facing the first electrically conductive member 440 is provided with a latch 451 on the surface, and the other of the first intermediate ring 453 and the second intermediate ring 454 is provided with a socket 452, where the first intermediate ring 453 and the second intermediate ring 454 are fixedly connected by inserting the latch 451 into the socket 452, and the first electrically conductive member 440 is held therebetween.

Referring to FIG. 12, in one embodiment, the multiple electrode core assemblies 400 constituting the electrode core string 401 are packaged in an encapsulation film 500. The electrode core assembly 400 includes an electrode core assembly body 430, and a first electrode lead-out member 410 and a second electrode lead-out member 420 for current output. The connection of the first electrode lead-out member 410 of one electrode core assembly 400 of two serially connected electrode core assemblies 400 with the second electrode lead-out member 420 of the other electrode core assembly 400 is located inside the encapsulation film 500. The encapsulation film 500 is formed with an encapsulation portion at a position corresponding to the first electrode lead-out member 410 and/or the second electrode lead-out member 420 to isolate two adjacent electrode core assembly bodies 430.

The multiple electrode core assemblies 400 are isolated by the encapsulation portion 510, to avoid the flow of the electrolyte solution of the multiple electrode core assemblies 400 from one to another. Therefore, the multiple electrode core assemblies 400 will not affect each other, and the electrolyte solution in the multiple electrode core assemblies 400 will not be decomposed due to a too high potential difference, thus ensuring the safety and service life of the battery.

The encapsulation portion 510 can be implemented in various forms. For example, the encapsulation film 500 can be tied with a cable to form the encapsulation portion 510, or the encapsulation film 500 is directly thermally melted to form the encapsulation portion 510. The specific method of forming the encapsulation portion 510 is not particularly limited.

In the present disclosure, the encapsulation film 500 is preferably formed of a sealing material that is a PET/PP composite film or an aluminum-plastic film. However, it will expand after the capacity grading and formation of the electrode core assembly 400. In the present disclosure, preferably the cavity inside the encapsulation film 500 is evacuated to constrain the electrode core assembly 400, so an air tightness requirement is raised for the accommodating cavity 300 in the encapsulation film 500.

Referring to FIG. 13, in some other embodiments, each electrode core assembly 400 is encapsulated in one encapsulation film 500 to form an electrode core assembly, and the electrode core assemblies are serially connected.

In other words, the number of the encapsulation film 500 corresponds to the number of the electrode core assembly 400, and each electrode core assembly 400 is individually encapsulated in one encapsulation film 500. In this implementation, after multiple electrode core assemblies 400 are prepared, one encapsulation film 500 can be separately wrapped outside each electrode core assembly 400, and then the electrode core assembly are connected in series.

Figure 14:
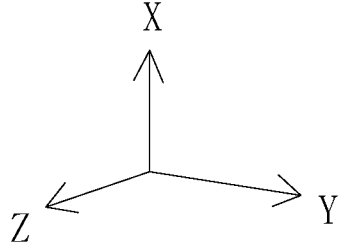
FIG. 14 is a partially enlarged view of part M in FIG. 2.
Figure 14:
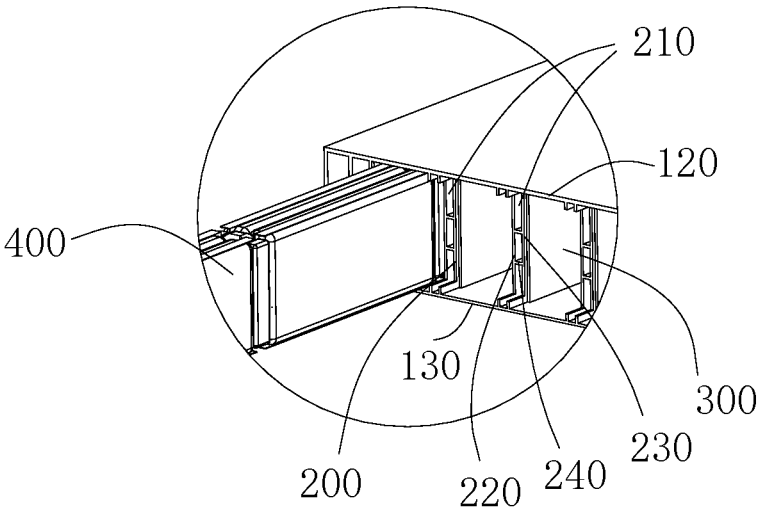

Referring to FIG. 14, in one embodiment, a heat dissipation passage 210 is provided in the structural beam 200. As such, the heat generated by the electrode core assembly 400 can enter the heat dissipation passage 210 and then be transferred to the outside of the housing by the top plate 120 and the bottom plate 130. Compared with a structural beam 200 designed with a solid structure, this structure design in the present disclosure increases the space for heat dissipation in the housing, thus improving the cooling effect.

Further, the length of the electrode core assembly 400 extends in the second direction, and the thickness of the electrode core assembly 400 extends in the third direction. The surface of the electrode core assembly 400 in the third direction faces the structural beam 200, and the extension direction of the heat dissipation passage 210 is the same as the second direction. Namely, the surface of the electrode core assembly 400 with the largest area in the thickness direction approximates the structural beam 200, to increase the efficiency of heat dissipation of the electrode core assembly 400 by the heat dissipation passage 210 in the structural beam 200.

In one embodiment, the structural beam 200 includes a first side plate 220 and a second side plate 230 arranged at an interval in the third direction. The first side plate 220, the second side plate 230, the top plate 120 and the bottom plate 130 jointly define the heat dissipation passage 210. In other words, the space jointly defined by the first side plate 220, the second side plate 230, the top plate 120 and the bottom plate 130 is the heat dissipation passage 210. That is to say, the heat dissipation passage 210 is formed by the components of the housing and the structural beam 200, and there is no need to additionally arrange heat pipes to form the heat dissipation passage 210, so as to save materials. Moreover, the heat dissipation passage 210 is formed in the battery pack 10, which will not affect the structural stability of the entire battery pack 10.

In one embodiment, the structural beam 200 further includes a partition plate 240 connected to the first side plate 220 and the second side plate 230, where the partition plate 240 divides the heat dissipation passage 210 into multiple sub-passages. The number of the partition plate 240 is not limited. When multiple partition plates 240 are provided, preferably, the partition plates 240 are symmetrically arranged between the first side plate 220 and the second side plate 230. The symmetrical structure can improve the stability of the structural beam 200.

In one embodiment, an atmospheric pressure in the accommodating cavity 300 is lower than an atmospheric pressure outside the housing. By evacuating the interior of the accommodating cavity 300, the atmospheric pressure in the accommodating cavity 300 is made lower than atmospheric pressure outside the housing. After the accommodating cavity 300 is evacuated, the moisture and oxygen present in the housing can be reduced, to avoid the long-term aging effect of moisture and oxygen on the electrode core assembly 400 and various components in the housing, and improve the service life of the electrode core assembly 400 or various components in the housing.

In one embodiment, the housing is provided with an exhaust orifice 190 (as shown in FIG. 2). One or more exhaust orifices 190 may be provided, which can be arranged at a position of the top plate 120 or the bottom plate 130 corresponding to the accommodating cavity 300, or on the third side frame 160 and the fourth side frame 170.

In one embodiment, the housing is provided with an adhesive injection hole 1010 communicating with the accommodating cavity 300 (as shown in FIG. 1). Each accommodating cavity 300 corresponds to at least one adhesive injection hole 1010, and The adhesive injection hole 1010 is configured to fill an adhesive into a corresponding accommodating cavity 300, to fixedly connect the electrode core assembly 400 and the housing. Some adhesive injection holes 1010 are shown in FIG. 1. The electrode core assembly 400, the housing and the structural beam 200 can be fixedly connected by perfusion of a hollow glass microbead filler adhesive or a structural adhesive, to further improve the structural strength of the battery pack 10.

In one embodiment, two adjacent electrode core assemblies 400 forming the electrode core string 401 are electrically connected through the first electrically conductive member 440, and the adhesive injection hole is arranged corresponding to the first electrically conductive member 440. Such an arrangement ensures a high connection strength between the electrode core assemblies 400.

In one embodiment, the battery pack 10 further includes a sampling assembly, configured to collect the information of the electrode core assembly 400, to learn the current working status of the electrode core assembly 400. The information of the electrode core assembly 400 includes the voltage, current or temperature information of the electrode core assembly 400, as well as the atmospheric pressure information in the accommodating cavity 300.

Figure 15:
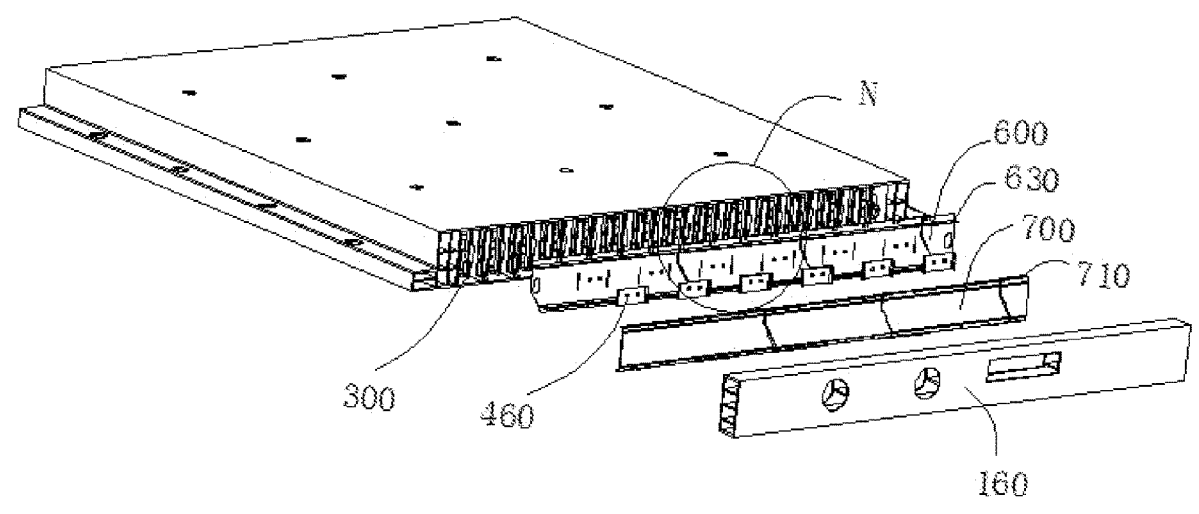
FIG. 15 is an exploded perspective view of a battery pack provided in an embodiment of the present disclosure.
Figure 16:
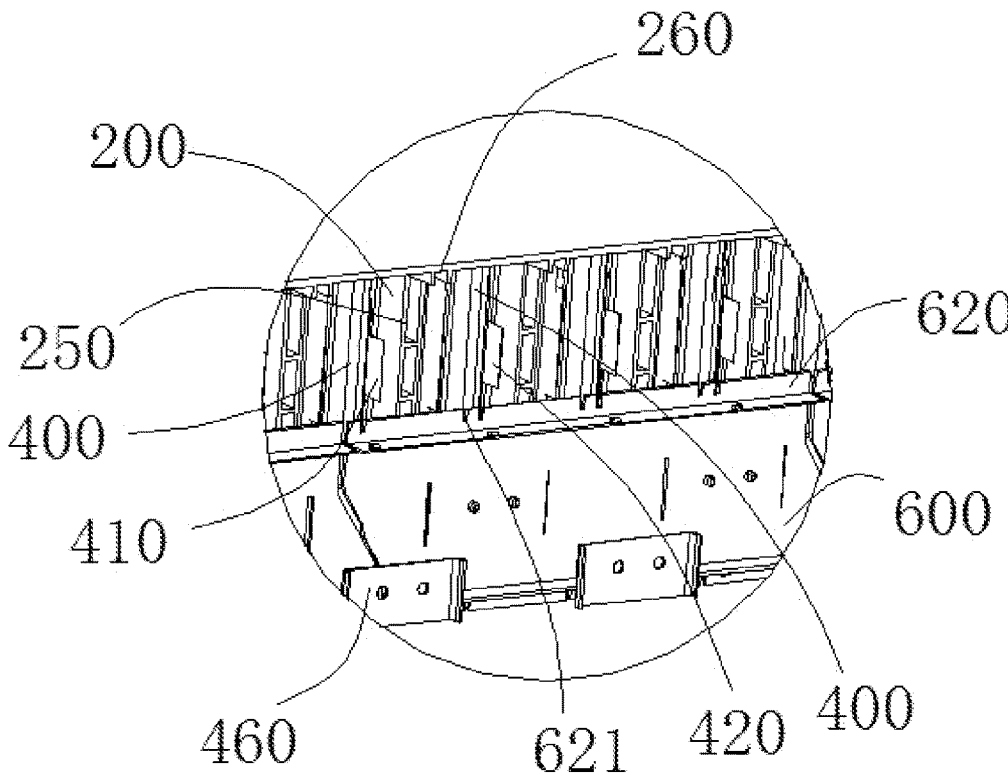
FIG. 16 is a partially enlarged view of part N in FIG. 15.
Figure 17:
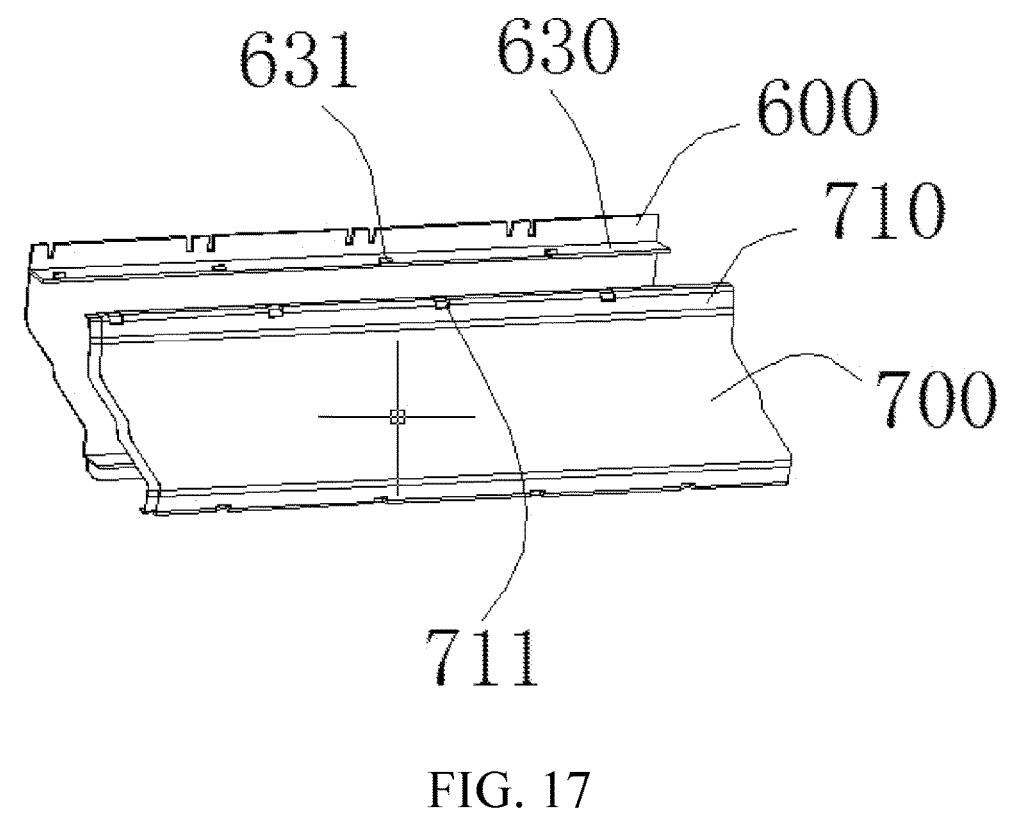
FIG. 17 is a partially exploded perspective view of an insulating fixing member and a protective cover provided in an embodiment of the present disclosure.

Referring to FIGS. 15 to 17, in one embodiment, the accommodating cavity is provided with a second opening at an end in the second direction, and two electrode core assemblies 400 located in two adjacent accommodating cavities 300 at the same side and adjacent to the second openings are electrically connected through a second electrically conductive member 460. That is, the first electrode core assembly 400 in one accommodating cavity 300 of two adjacent accommodating cavities 300 is electrically connected to the first electrode core assembly 400 in the other accommodating cavity 300 via the second electrically conductive member 460; or the last electrode core assembly 400 in one accommodating cavity 300 of two adjacent accommodating cavities 300 is electrically connected to the last electrode core assembly 400 in the other accommodating cavity 300 via the second electrically conductive member 460.

In one embodiment, an insulating fixing member 600 is provided at the second opening, and the second electrically conductive member 460 is fixed to the insulating fixing member 600. The insulating fixing member 600 serves to fix, support, and electrically isolates the second electrically conductive member 460.

In an embodiment, the accommodating cavity 300 is provided with a second opening at two ends in the second direction, and two insulating fixing members 600 are arranged, at the corresponding second openings.

In one embodiment, the second electrically conductive member 460 is arranged at the side of the insulating fixing member 600 away from the electrode core assembly 400. The electrode core assembly 400 includes a first electrode lead-out member 410 and a second electrode lead-out member 420 for current output. The first electrode lead-out member 410 and the second electrode lead-out member 420 are arranged at two opposite sides of the electrode core assembly 400 in the second direction. The first electrode lead-out member 410 of one electrode core assembly 400 in two electrode core assemblies 400 located in two adjacent accommodating cavities 300 at the same side and adjacent to the second openings and the first electrode lead-out member 410 of the other electrode core assembly 400 penetrate through the insulating fixing member 600 and are electrically connected by the second electrically conductive member 460, to realize the parallel connection of the electrode core assemblies 400 in two adjacent accommodating cavities 300. The connection path of this connection pattern is relatively short, thus reducing the internal resistance.

In an embodiment, the second electrode lead-out member 420 of one electrode core assembly 400 in two electrode core assemblies 400 located in two adjacent accommodating cavities 300 at the same side and adjacent to the second openings and the second electrode lead-out member 420 of the other electrode core assembly 400 penetrate through the insulating fixing member 600 and are electrically connected by the second electrically conductive member 460, to realize the parallel connection of the electrode core assemblies 400 in two adjacent accommodating cavities 300. The connection path of this connection pattern is relatively short, thus reducing the internal resistance.

In another embodiment, the first electrode lead-out member 410 of one electrode core assembly 400 in two electrode core assemblies 400 located in two adjacent accommodating cavities 300 at the same side and adjacent to the second openings and the second electrode lead-out member 420 of the other electrode core assembly 400 penetrate through the insulating fixing member 600 and are electrically connected by the second electrically conductive member 460, to realize the serial connection of the electrode core assemblies 400 in two adjacent accommodating cavities 300. The connection path of this connection pattern is relatively short, thus reducing the internal resistance.

In one embodiment, the second electrically conductive member 460 is provided with a fixing hole, and a fixing portion is provided on one site of the insulating fixing member 600 away from the electrode core assembly 400, where the fixing portion is fixed in the fixing hole, to fix the second electrically conductive member 460 to the insulating fixing member 600. In other embodiments, the second electrically conductive member 460 can also be fixed to the side of the insulating fixing member 600 away from the electrode core assembly 400 by gluing.

In one embodiment, two sides of the insulating fixing member 600 in the first direction are provided with an engaging portion 620 (as shown in FIG. 16), and the insulating fixing member 600 is engaged and fixed to the structural beam 200 via the engaging portions 620. Therefore, the insulating fixing member 600 is connected and fixed to the housing.

Specifically, the engaging portions 620 are arranged opposite to each other in the first direction, multiple engaging portions 620 are arranged, and the multiple engaging portions 620 are disposed in the third direction. The arrangement direction of the engaging portions 620 is the same as that of the structural beams 200, that is, in the third direction.

In one embodiment, ends of the structural beam 200 are provided with extension portions 260 arranged opposite to each other in the first direction. The structural beam 200 and the extension portions 260 define a recess portion 250, and the insulating fixing member 600 is engaged to the extension portion 260 through the engaging portion 620 so as to be fixed in the recess portion 250.

In one embodiment, the engaging portion 620 is provided with a groove 621, and the extension portion 260 is an engaging block, where the engaging block 620 is engaged in the groove 261. In this embodiment, since the structural beam 200 includes the first side plate 220 and the second side plate 230 arranged at an interval in the third direction, the extension portion 260 correspondingly has two side plate extension portions arranged opposite to each other, and the engaging portion 620 is provided with two grooves 621, where the two oppositely arranged side plate extension portions are respectively engaged in the two grooves 621. In some other embodiments, the extension portion 260 is provided with a groove, the engaging portion 620 is an engaging block, and the engaging block 620 is engaged in the groove 261.

In one embodiment, the battery pack 10 further includes a protective cover 700 (as shown in FIG. 15), and the protective cover 700 is arranged at the side of the insulating fixing member 600 away from the electrode core assembly 400. The protective cover 700 protects the insulating fixing member 600 and components located in the accommodating cavity 300 such as the electrode core assembly 400. As shown in FIG. 1 and FIG. 15, the protective cover 700 is located at an inner side of the end plate 112, that is, the side of the end plate 112 close to the electrode core assembly 400.

In an embodiment, two protective cover 700 are provided, and the two protective covers 700 are arranged at two sides of the housing body 100 in the second direction. One protective cover 700 is located at the inner side of the third side frame 160, and the other is located at the inner side of the fourth side frame 170.

In one embodiment, the protective cover 700 is provided with a flanging portion 710 extending toward the accommodating cavity 300 at two sides in the first direction (as shown in FIG. 15 and FIG. 17), the insulating fixing member 600 is provided with a connecting piece 630 at a side away from the accommodating cavity 300. Two connecting pieces 630 are provided and arranged opposite to each other in the first direction, and the two connecting pieces 630 are arranged at two sides of the second electrically conductive member 460. The flanging portion 710 is engaged to the connecting piece 630 to fixedly connect the protective cover 700 and the insulating fixing member 600.

In one embodiment, the connecting piece 630 is provided with an engaging hook 631 at a side away from the second electrically conductive member 460, and the flanging portion 710 is provided with an engaging slot 711, where the engaging hook 631 is engaged to the engaging slot 711, to fixedly connect the protective cover 700 and the insulating fixing member 600. In some embodiments, the connecting piece 630 is provided with an engaging slot, and the flanging portion 710 is provided with an engaging hook at a side close to the accommodating cavity 300, where the engaging hook is engaged to the engaging slot, to fixedly connect the protective cover 700 and the insulating fixing member 600.

Figure 18:
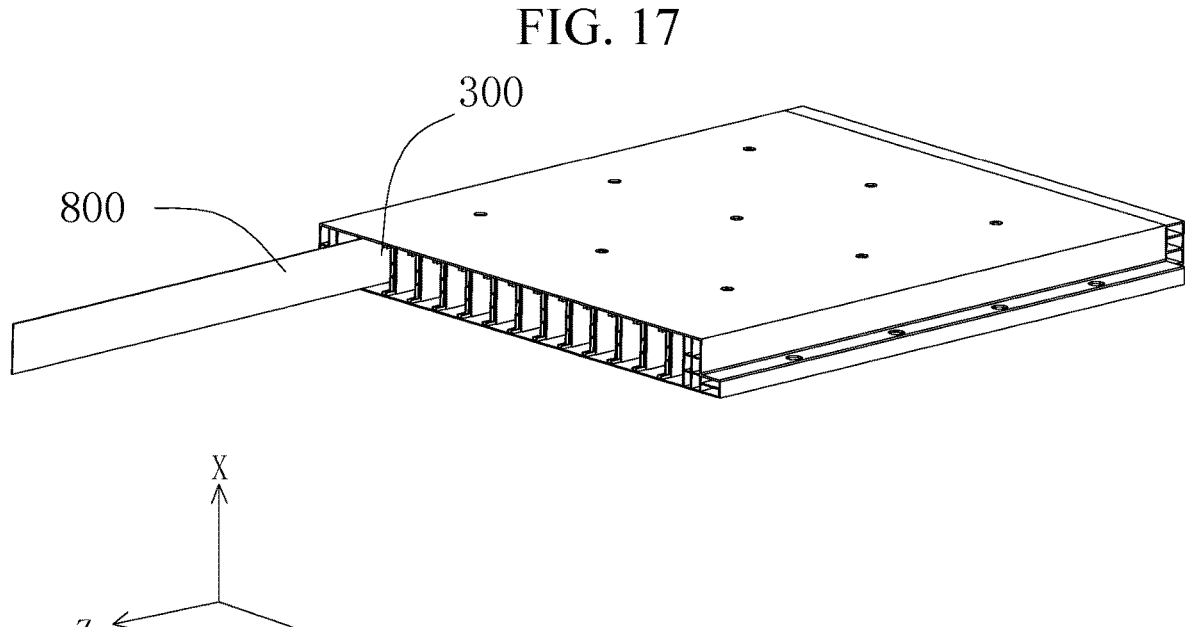
FIG. 18 is a schematic structural view of an electrical and thermal insulating member fitting to a housing provided in an embodiment of the present disclosure.

Referring to FIG. 18, in one embodiment, an electrical and thermal insulating member 800 is provided in the accommodating cavity 300.

In an embodiment, the electrical and thermal insulating member 800 is an electrical and thermal insulating plate, and attached to a surface of the electrode core assembly 400 in the thickness direction, where the thickness direction of the electrode core assembly 400 is the third direction. That is to say, the surface of the electrode core assembly 400 with the largest area in the thickness direction is attached to the electrical and thermal insulating plate, to improve the electrical and thermal insulating effect.

In another embodiment, the electrical and thermal insulating member 800 is an electrical and thermal insulating coating provided on an inner wall of the accommodating cavity 300.

Figure 19:
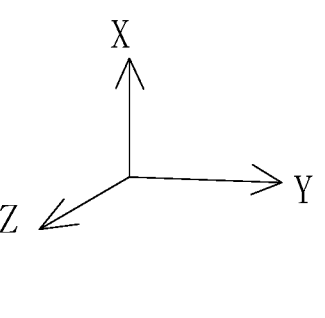
FIG. 19 is a schematic structural view of a battery pack omitting a third side frame and a fourth side frame provided in an embodiment of the present disclosure.
Figure 19:
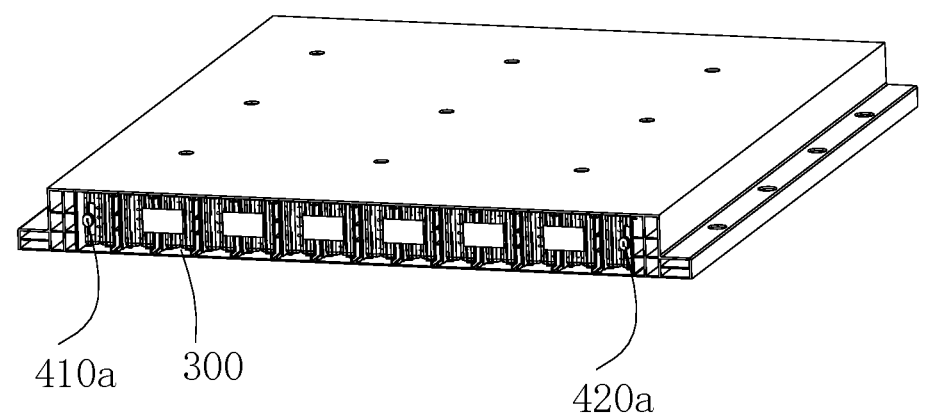

Referring to FIG. 19, in one embodiment, the battery pack 10 further includes a first bus electrode 410a and a second bus electrode 420a for current output. The first bus electrode 410a and the second bus electrode 420a are located at a same side of the housing in the second direction. Further, the first bus electrode 410a and the second bus electrode 420a can be led out from the third side frame 160 or the fourth side frame 170.

Specifically, the electrode core assembly 400 includes a first electrode lead-out member 410 and a second electrode lead-out member 420 for current output. The first electrode lead-out member 410 and the second electrode lead-out member 420 are arranged at two opposite sides of the electrode core assembly 400 in the second direction. Multiple electrode core assemblies 400 forming the electrode core string in the accommodating cavity 300 are disposed in the second direction and connected in series.

Multiple accommodating cavities 300 are disposed in the third direction, and the first electrode lead-out member 410 of the first electrode core assembly 400 in the first accommodating cavity 300 and the second electrode lead-out member 420 of the first electrode core assembly 400 in the last accommodating cavity 300 in the multiple accommodating cavities 300 arranged in the third direction are located at a same side of the housing. One of the first electrode lead-out member 410 and the second electrode lead-out member 420 is the first bus electrode 410a, and the other is the second bus electrode 420a. Moreover, one of the first bus electrode 410a and the second bus electrode 420a is the positive electrode, and the other is negative electrode. In this way, the output directions of the current from the positive and negative of the battery pack 10 as a whole are at the same side, to facilitate the connection with an external device, for example an electronic device on the vehicle.

In some other embodiments, the second electrode lead-out member 420 of the last electrode core assembly 400 in the first accommodating cavity 300 and the first electrode lead-out member 410 of the last electrode core assembly 400 in the last accommodating cavity 300 in the multiple accommodating cavities 300 arranged in the third direction are located at a same side of the housing. One of the first electrode lead-out member 410 and the second electrode lead-out member 420 is the first bus electrode 410*a*, and the other is the second bus electrode 420*a*. Moreover, one of the first bus electrode 410*a* and the second bus electrode 420*a* is the positive electrode, and the other is negative electrode. In this way, the output directions of the current from the positive and negative of the battery pack 10 as a whole are at the same side, to facilitate the connection with an external device, for example an electronic device on the vehicle.

Figure 20:
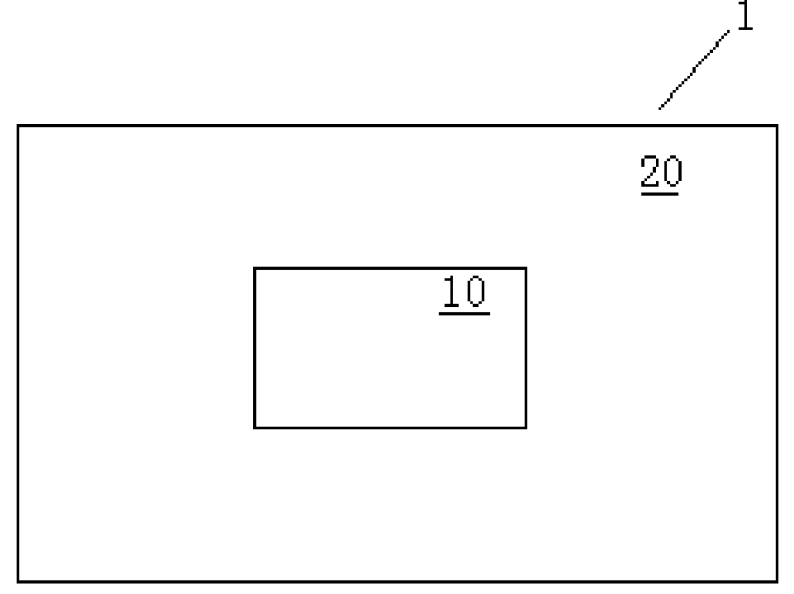
FIG. 20 is a schematic structural view of an electric vehicle provided in an embodiment of the present disclosure.

The present disclosure further provides an electric vehicle 1. As shown in FIG. 20, the vehicle includes a vehicle body 20 and a battery pack as described above, where the battery pack is fixed to the vehicle body 20 by the mounting portion. In the electric vehicle 1 provided in the present disclosure, when this battery pack 10 is mounted on the vehicle, the structural strength of the battery pack 10 provides part of the structural strength of the vehicle, to improve the structural strength of the vehicle, help to meet the design requirement of lightweight of the electric vehicle, and reduce the design and manufacturing costs of the vehicle. In addition, the battery pack according to the present disclosure has a relatively low height, and thus will not occupy too much space in the height of the vehicle.

The described embodiments are merely some embodiments of the present disclosure, which are specific and detailed. However, it is not to be understood as a limitation to the patent scope of the present disclosure. It should be noted that for a person of ordinary skill in the art, various changes and improvements may be made without departing from the concept of the present disclosure, and such changes or improvements shall fall within the protection scope of the present disclosure. Therefore, the protection scope of the present disclosure shall be subject to the protection scope of the appended claims.

What is claimed is:

1. A battery pack, comprising:
a housing, and at least one structural beam and a plurality of electrode core strings electrically connected to one another located in the housing, wherein
the housing comprises a housing body, comprising a top plate and a bottom plate arranged opposite to each other in a first direction, wherein the first direction is a height direction of the housing; the structural beam is located between the top plate and the bottom plate, the at least one structural beam is connected to the top plate and the bottom plate, the at least one structural beam divides the interior of the housing into a plurality of accommodating cavities, and at least one electrode core string is provided in at least one accommodating cavity;
a mounting portion is provided on the housing, and the mounting portion is configured to be connected and fixed to an external load; and
the electrode core string comprises a plurality of electrode core assemblies sequentially disposed in a second direction and connected in series; the electrode core assembly is encapsulated in an encapsulation film; and a length direction of the electrode core string extends in the second direction, wherein the second direction is a width direction of the housing or the second direction is a length direction of the housing,
wherein the electrode core assembly comprises an electrode core assembly body, and a first electrode lead-out member and a second electrode lead-out member for current output, wherein the first electrode lead-out member and the second electrode lead-out member are arranged at two opposite sides of the electrode core assembly body in the second direction, and the first electrode lead-out member of one electrode core assembly of two adjacent electrode core assemblies in the electrode core string is electrically connected to the second electrode lead-out member of the other electrode core assembly via a first electrically conductive member;
a fixing intermediate ring is arranged between the electrode core assembly bodies of two adjacent electrode core assemblies, wherein the first electrically conductive member is fixed in the fixing intermediate ring; a structural adhesive is filled between the electrode core assembly bodies of two adjacent electrode core assemblies and the fixing intermediate ring; and
the fixing intermediate ring comprises a first intermediate ring and a second intermediate ring arranged opposite to each other in a third direction, wherein the first electrically conductive member is located between the first intermediate ring and the second intermediate ring, the first intermediate ring and the second intermediate ring are connected to clamp and fix the first electrically conductive member, and the third direction is different from the first direction and the second direction.

2. The battery pack according to claim 1, wherein a plurality of structural beams are provided, the plurality of structural beams are spaced in a third direction, a length of the structural beam extends in the second direction, wherein the third direction is different from the first direction and the second direction; the plurality of structural beams are connected to the top plate and the bottom plate; and the housing body is integrally formed with the structural beam.

3. The battery pack according to claim 1, wherein the housing body further comprises a first side frame and a second side frame arranged at two sides of the housing body in a third direction; the second direction is the length direction of the housing, and the third direction is the width direction of the housing; or the second direction is the width direction of the housing, and the third direction is the length direction of the housing.

4. The battery pack according to claim 3, further comprising a cavity inside at least one of the first side frame and the second side frame, wherein a strengthening plate is provided in the cavity, and the strengthening plate divides the cavity into a plurality of sub-cavities.

5. The battery pack according to claim 4, wherein the first side frame and the second side frame are provided with a mounting portion.

6. The battery pack according to claim 1, wherein the housing body is provided with a first opening at two ends in the second direction and an end plate; the end plate comprises a third side frame and a fourth side frame, and the third side frame and the fourth side frame are sealingly connected to the housing body to close the corresponding first opening.

7. The battery pack according to claim 6, wherein the housing body, the third side frame, and the fourth side frame are metal pieces that are sealingly connected by welding.

8. The battery pack according to claim 7, further comprising a sealing plate, wherein the accommodating cavity is provided with a second opening at an end in the second direction, the sealing plate is located at an inner side of the end plate, and the sealing plate blocks a part of the second opening adjacent to the bottom plate.

9. The battery pack according to claim 7, further comprising a sealing plate, wherein the accommodating cavity is provided with a second opening at an end in the second direction, the sealing plate is located at an inner side of the end plate, and the sealing plate completely blocks off the second opening.

10. The battery pack according to claim 1, wherein a length of the electrode core string is greater than 400 mm.

11. The battery pack according to claim 10, wherein a plurality of electrode core strings are provided in the accommodating cavity, the plurality of electrode core strings are sequentially arranged and electrically connected in a thickness direction of the electrode core assembly, the thickness direction of the electrode core assembly is parallel to a third direction, the second direction is the length direction of the housing, and the third direction is the width direction of the housing; or the second direction is the width direction of the housing, and the third direction is the length direction of the housing.

12. The battery pack according to claim 11, wherein the plurality of electrode core strings in the same accommodating cavity are connected in series, wherein the first electrode core assembly in one electrode core string of two adjacent electrode core strings is electrically connected to the first electrode core assembly in the other electrode core string, and the first electrode lead-out member of the first electrode core assembly in one electrode core string of two adjacent electrode core strings and the second electrode lead-out member of the first electrode core assembly in the other electrode core string are located at the same side; or the last electrode core assembly in one electrode core string of two adjacent electrode core strings is electrically connected to the last electrode core assembly in the other electrode core string, and the second electrode lead-out member of the last electrode core assembly in one electrode core string of two adjacent electrode core strings and the first electrode lead-out member of the last electrode core assembly in the other electrode core string are located at the same side.

13. The battery pack according to claim 11, wherein the plurality of electrode core strings in the same accommodating cavity are connected in parallel, wherein the first electrode core assembly in one electrode core string of two adjacent electrode core strings is electrically connected to the first electrode core assembly in the other electrode core string, and the last electrode core assembly in one electrode core string of two adjacent electrode core strings is electrically connected to the last electrode core assembly in the other electrode core string; and the first electrode lead-out member of the first electrode core assembly in one electrode core string of two adjacent electrode core strings and the first electrode lead-out member of the first electrode core assembly in the other electrode core string are located at the same side, and the second electrode lead-out member of the last electrode core assembly in one electrode core string of two adjacent electrode core strings and the second electrode lead-out member of the last electrode core assembly in the other electrode core string are located at the same side.

14. The battery pack according to any one of claim 11, wherein the electrode core strings in two adjacent accommodating cavities are connected in series, wherein the first electrode core assembly of one electrode core string in one accommodating cavity of two adjacent accommodating cavities is electrically connected to the first electrode core assembly of one electrode core string in the other accommodating cavity, and the first electrode lead-out member of the first electrode core assembly of one electrode core string in one accommodating cavity of two adjacent accommodating cavities and the second electrode lead-out member of the first electrode core assembly of one electrode core string in the other accommodating cavity are located at the same side; or the last electrode core assembly of one electrode core string in one accommodating cavity of two adjacent accommodating cavities is electrically connected to the last electrode core assembly of one electrode core string in the other accommodating cavity, and the first electrode lead-out member of the last electrode core assembly of one electrode core string in one accommodating cavity of two adjacent accommodating cavities and the second electrode lead-out member of the last electrode core assembly of one electrode core string in the other accommodating cavity are located at the same side.

15. The battery pack according to any one of claim 11, wherein the electrode core strings in two adjacent accommodating cavities are connected in parallel, wherein the first electrode core assembly of one electrode core string in one accommodating cavity of two adjacent accommodating cavities is electrically connected to the first electrode core assembly of one electrode core string in the other accommodating cavity, and the last electrode core assembly of one electrode core string in one accommodating cavity of two adjacent accommodating cavities is electrically connected to the last electrode core assembly of one electrode core string in the other accommodating cavity; or the first electrode lead-out member of the first electrode core assembly of one electrode core string in one accommodating cavity of two adjacent accommodating cavities and the first electrode lead-out member of the first electrode core assembly of one electrode core string in the other accommodating cavity are located at the same side, and the second electrode lead-out member of the last electrode core assembly of one electrode core string in one accommodating cavity of two adjacent accommodating cavities and the second electrode lead-out member of the last electrode core assembly of one electrode core string in the other accommodating cavity are located at the same side.

16. The battery pack according to claim 1, wherein one electrode core string is provided in the accommodating cavity; and the electrode core strings in two adjacent accommodating cavities are connected in series or in parallel, wherein when the electrode core strings in two adjacent accommodating cavities are connected in series, the first electrode core assembly of the electrode core string in one accommodating cavity of two adjacent accommodating cavities is electrically connected to the first electrode core assembly of the electrode core string in the other accommodating cavity, or the last electrode core assembly of the electrode core string in one accommodating cavity of two adjacent accommodating cavities is electrically connected to the last electrode core assembly of the electrode core string in the other accommodating cavity; and when the electrode core assemblies in two adjacent accommodating cavities are connected in parallel, the first electrode core assembly of the electrode core string in one accommodating cavity of two adjacent accommodating cavities is electrically connected to the first electrode core assembly of the electrode core string in the other accommodating cavity, or the last electrode core assembly of the electrode core string in one accommodating cavity of two adjacent accommodating cavities is electrically connected to the last electrode core assembly of the electrode core string in the other accommodating cavity.

17. The battery pack according to claim 1, wherein the plurality of electrode core assemblies constituting the electrode core string are packaged in the encapsulation film; wherein the connection of the first electrode lead-out member of one electrode core assembly of two serially connected electrode core assemblies with the second electrode lead-out member of the other electrode core assembly is located inside the encapsulation film; and the encapsulation film is formed with an encapsulation portion at a position corresponding to at least one of the first electrode lead-out member and the second electrode lead-out member to isolate two adjacent electrode core assembly bodies.

18. The battery pack according to claim 1, wherein each electrode core assembly is encapsulated in one encapsulation film to form an electrode core assembly piece, and the electrode core assembly pieces are serially connected.

19. The battery pack according to claim 1, wherein an exhaust orifice is provided on the housing.

20. The battery pack according to claim 1, wherein the housing is provided with an adhesive injection hole communicating with the accommodating cavity, each accommodating cavity corresponds to at least one adhesive injection hole, and the adhesive injection hole is configured to fill an adhesive into a corresponding accommodating cavity, to fixedly connect the electrode core assembly and the housing.

21. The battery pack according to claim 20, wherein two adjacent electrode core assemblies forming the electrode core string are electrically connected through the first electrically conductive member, and the adhesive injection hole is arranged corresponding to the first electrically conductive member.

22. The battery pack according to claim 1, further comprising a sampling assembly, configured to collect the information of the electrode core assembly.

23. An electric vehicle, comprising a vehicle body and a battery pack according to claim 1, wherein the battery pack is fixed to the vehicle body by the mounting portion.

\*   \*   \*   \*   \*